US009818224B1

(12) United States Patent
Worley et al.

(10) Patent No.: US 9,818,224 B1
(45) Date of Patent: Nov. 14, 2017

(54) AUGMENTED REALITY IMAGES BASED ON COLOR AND DEPTH INFORMATION

(71) Applicant: AMAZON TECHNOLOGIES, INC., Reno, NV (US)

(72) Inventors: Connor Spencer Blue Worley, San Diego, CA (US); Devin Bertrum Pauley, Mountain View, CA (US)

(73) Assignee: Amazon Technologies, Inc., Reno, NV (US)

( * ) Notice: Subject to any disclaimer, the term of this patent is extended or adjusted under 35 U.S.C. 154(b) by 307 days.

(21) Appl. No.: 13/922,999

(22) Filed: Jun. 20, 2013

(51) Int. Cl.
| | |
|---|---|
| G06T 19/00 | (2011.01) |
| G06Q 30/06 | (2012.01) |
| G06T 17/00 | (2006.01) |
| G06T 17/10 | (2006.01) |
| G06T 17/20 | (2006.01) |
| H04N 13/02 | (2006.01) |

(52) U.S. Cl.
CPC ....... *G06T 19/006* (2013.01); *H04N 13/0275* (2013.01); *G06Q 30/0601* (2013.01)

(58) Field of Classification Search
CPC ....... G06T 19/006; G06T 15/08; G06T 15/50; G06T 2207/30244; G06T 17/00; G06T 17/10; G06T 17/20; H04N 13/0468; H04N 13/0275; G06Q 30/0601; G06Q 30/0641
USPC ....... 345/619, 660, 420, 424, 633, 629, 632; 705/26.81, 26.1, 26.5, 27.2, 27.1; 348/239
See application file for complete search history.

(56) References Cited

U.S. PATENT DOCUMENTS

| | | | | |
|---|---|---|---|---|
| 6,144,388 A | * | 11/2000 | Bornstein | G06T 11/00 345/629 |
| 6,546,309 B1 | * | 4/2003 | Gazzuolo | G06Q 30/0601 33/512 |
| 7,663,648 B1 | * | 2/2010 | Saldanha | G06T 17/00 345/419 |
| 8,674,989 B1 | * | 3/2014 | Dalal | G06T 15/50 345/420 |
| 2001/0026272 A1 | * | 10/2001 | Feld | A41H 3/007 345/419 |
| 2002/0024517 A1 | * | 2/2002 | Yamaguchi et al. | 345/424 |
| 2003/0050864 A1 | * | 3/2003 | Trajkovic | G06Q 30/02 705/26.35 |
| 2003/0101105 A1 | * | 5/2003 | Vock | G06Q 10/043 705/27.2 |
| 2009/0133260 A1 | * | 5/2009 | Durbin et al. | 29/896.11 |

(Continued)

*Primary Examiner* — Chante Harrison
(74) *Attorney, Agent, or Firm* — Lindauer Law, PLLC

(57) ABSTRACT

Techniques are described for generating a composite image that depicts a first object with a second object. Two-dimensional images of the first object are captured, along with depth information that includes three-dimensional coordinates of points on the surface of the first object. Based on the depth information, a polygonal model may be determined for the first object including color information determined from the images. The polygonal model of the first object may be placed with a polygonal model of the second object in a virtual scene, and ray tracing operations may generate a plurality of pixels for the composite image. In cases where the first object represents a user and the second object represents a product, the composite image may provide a substantially realistic preview of the user with the product.

21 Claims, 12 Drawing Sheets

(56) References Cited

U.S. PATENT DOCUMENTS

| | | | |
|---|---|---|---|
| 2010/0076867 A1* | 3/2010 | Inoue | G06F 17/30256 705/26.1 |
| 2010/0306082 A1* | 12/2010 | Wolper et al. | 345/619 |
| 2011/0022965 A1* | 1/2011 | Lawrence | G06F 3/011 715/747 |
| 2013/0006814 A1* | 1/2013 | Inoue et al. | 705/26.81 |
| 2013/0066750 A1* | 3/2013 | Siddique | G06Q 10/0637 705/27.2 |
| 2013/0113829 A1* | 5/2013 | Suzuki | G09G 5/00 345/633 |
| 2013/0215116 A1* | 8/2013 | Siddique et al. | 345/420 |
| 2013/0271625 A1* | 10/2013 | Gruber et al. | 348/239 |
| 2013/0322685 A1* | 12/2013 | Li | G06K 9/00 382/103 |
| 2014/0035913 A1* | 2/2014 | Higgins | G06T 17/00 345/420 |
| 2014/0100994 A1* | 4/2014 | Tatzel | G06Q 30/0268 705/27.1 |
| 2014/0176565 A1* | 6/2014 | Adeyoola | G06T 13/80 345/473 |
| 2014/0201023 A1* | 7/2014 | Tang | G06Q 30/0643 705/27.2 |

* cited by examiner

AUGMENTED REALITY IMAGES BASED ON COLOR AND DEPTH INFORMATION

BACKGROUND

With the increasing number and variety of products available for purchase over the World Wide Web, more users are opting to purchase products online instead of shopping at more traditional, brick-and-mortar stores. In many cases, it may be difficult for a user to determine whether a product is suitable based solely on an image or description of the product provided by a web site. This difficulty may lead to a frustrating user experience, product returns, negative product reviews, or lost sales.

Figure 1:
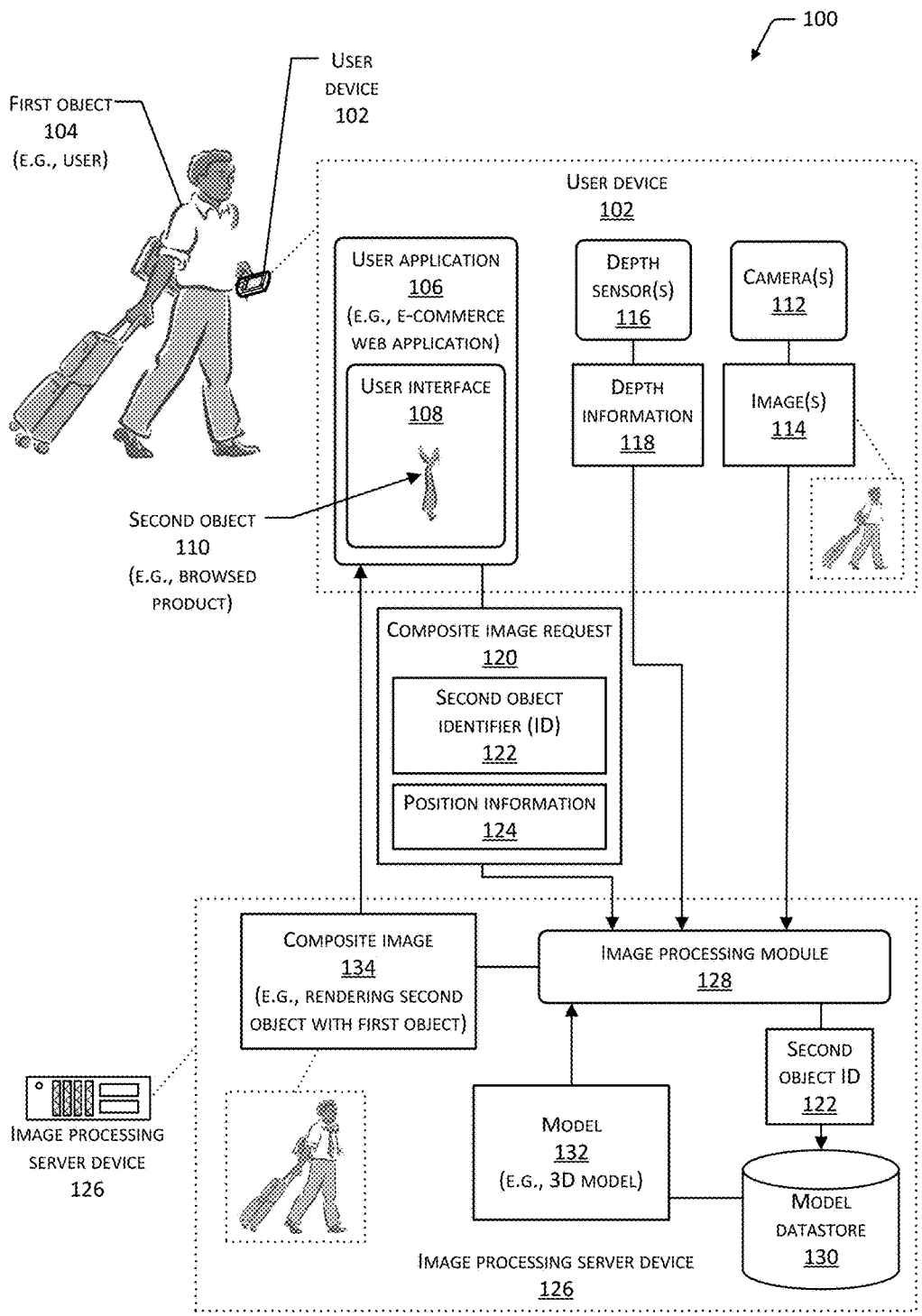
FIG. 1 depicts an environment for generating a composite image of a first object with a second object, including one or more user devices to generate image data and depth information regarding the first object, and one or more image processing server devices that generate the composite image based on the image data, the depth information, and a model of the second object.

Certain implementations and embodiments will now be described more fully below with reference to the accompanying figures, in which various aspects are shown. However, various aspects may be implemented in many different forms and should not be construed as limited to the implementations set forth herein. Like numbers refer to like elements throughout.

DETAILED DESCRIPTION

This disclosure describes implementations of systems, devices, methods, and computer-readable media for generating a composite image that depicts a first object with a second object. In some implementations, a user may employ a user device to browse a web site that offers one or more products for sale to the user, or that are otherwise available for use by the user. The user may browse a particular product, and request a preview image that is a composite image depicting the product in a virtual scene with the user. Alternatively, the user may request a composite image that shows the product with another item such an article of furniture, an appliance, a piece of art, or that shows the product in a setting such as a portion of the user's home, workplace, and so forth. Implementations support the generation of a composite image showing a first object with a second object, where the second object may include a product and the first object may include one or more of the user, an item other than the product, or a setting as described above.

Implementations may access one or more two-dimensional images of the first object that include color information for the first object, and may access depth information that includes three-dimensional coordinates of tracking points on one or more surfaces of the first object. The depth information may be generated based on data collected by one or more depth sensors included in a user device, or external to the user device. The depth sensors may employ any technology to collect data for generating depth information. In some implementations, the depth information is determined based on energy (e.g., infrared light) projected from one or more depth sensors onto a plurality of tracking points on one or more surfaces of the first object. Thus, the tracking points may be targets of the energy projected from the depth sensor(s). Each tracking point may be on a surface, on an edge where two surfaces meet, or at a corner where more than two surfaces meet. The depth sensor(s) may detect at least a portion of the energy reflected of the surface(s) of the first object. Based on an analysis of the position, brightness, or other properties of the reflected energy, three-dimensional coordinates may be determined for the tracking points. In some cases, the analysis to determine the three-dimensional coordinates may be performed by the depth sensors. Alternatively, the analysis may be performed by a process executed in another component of the user device or another device.

Implementations support the use of other techniques, active or passive, to generate the depth information, including but not limited to coded aperture methods, echolocation, triangulation, structured light-based methods, time-of-flight, interferometry, stereoscopic imaging, and so forth. Tracking points may include three-dimensional points on a surface of an object, as determined by any of the above techniques. In some implementations, a subset of the tracking points may be identified and used in subsequent processing to generate a composite image as described below.

In some implementations, the depth information may be transformed into a first polygonal mesh that describes one or more surfaces of the first object, where one or more points included in each polygon are assigned a color attribute based on the color information in the two-dimensional image(s). Implementations may also access a three-dimensional model of the second object. Based on the model of the second object, a second polygonal mesh may be determined that describes one or more surface of the second object. One or more polygons of the first polygonal mesh may be virtually arranged with one or more polygons of the second polygonal mesh to create a virtual scene that presents at least a portion of the second object with at least a portion of the first object. Ray tracing operations may be performed to generate a plurality of pixels by tracing a plurality of virtual light rays from one or more virtual light sources to the polygons of the first and second polygonal meshes. The plurality of pixels may be assembled into the composite image that depicts the second object with the first object.

The model of the second object may be a representation of the second object, the representation including data that is stored in memory on a computing device or that is generated or manipulated using processes executing on a computing device. Although the second object may be a tangible object that has a physical presence, the model of the second object may not, itself, have a physical presence beyond the data stored or communicated within a computing device. As such, the model may include a computational, mathematical, or virtual model. Similarly, the virtual scene may be a representation of the first object with the second object, the representation including data that is stored in memory on a computing device or that is generated or manipulated using processes executing on a computing device. The virtual scene may not correspond to an actual, physical scene in which the first and second objects are arranged. The model or the virtual scene may include substantially static data representing the first or second object (e.g., as an image of the first or second object), dynamic data that is generated dynamically to describe the first or second object, or both static and dynamic data.

The composite image may be sent to the user device, and a user may employ the composite image to determine whether to purchase or otherwise acquire the product offered through the web site. Because the composite image is generated using ray tracing through virtual light sources that provide similar virtual illumination to both the first and second objects, implementations may generate a composite image in which the first and second objects appear to be realistically presented in a same scene. Accordingly, the composite image may enable the user to virtually try on or otherwise view the second object in a realistically presented scene, and thus make a more informed decision regarding whether to purchase or otherwise acquire the second object. The user may store the composite image for later reference. The user may also share the composite image with a spouse, a partner, family members, co-workers, friends, and others, to solicit their opinions regarding the second object.

FIG. 1 depicts an environment 100 for generating a composite image of a first object with a second object. The environment 100 may include one or more user devices 102. The user device 102 may include any type of computing device, including but not limited to a smartphone, a tablet computer, a wearable computer, an implanted computer, a mobile gaming device, an electronic book reader, an automotive computer, a desktop computer, a personal computer, a laptop computer, a thin client, a terminal, a game console, a smart appliance, a home entertainment device, and so forth. The user device 102 is described further with reference to FIG. 2. As shown in FIG. 1, the user device 102 is employed by a user, and at least a portion of that user may be a first object 104. Alternatively, the first object 104 may include at least a portion of another user, or an item such as a piece of furniture, a piece of artwork, an appliance, and so forth. The first object 104 may also include a setting such as a portion of the user's home, workplace, or other location. The first object 104 may include any number of users, items, or settings, in any combination.

The user device 102 may execute a user application 106. In some cases, the user application 106 may be a web application that executes within a web browser to interact with one or more web sites or one or more web pages. For example, the user application 106 may include an e-commerce application that enables a user to browse various products and services offered by an online merchant or other service. The user application 106 may include a user interface 108 through which the user may interact with the user application 106. An example of the user interface 108 is described further with reference to FIG. 4. Through the user interface 108, the user may browse one or more products or other items, such as a second object 110. Although the example of FIG. 1 depicts the user browsing a particular second object 110 (e.g., a neck tie), implementations are not limited to a particular second object 110 or to a particular type of the second object 110. Implementations support any type of the second object 110, including but not limited to clothing, jewelry, apparel, pieces of art or decor, appliances, electronic devices, plants, animals, construction materials, fixtures, books, food or drink items, vehicles, prosthetics, and so forth.

The user device 102 may include one or more cameras 112, which may include any type of image capture device used to capture one or more images 114 of at least a portion of the first object 104. The camera(s) 112 may include a still image camera, a video camera, a strip imaging device, a photodetector, or any other device that detects light or electromagnetic energy, and that records information describing the detected light or electromagnetic energy. The image(s) 114 may include one or more still images or at least a portion of one or more frames of video data. The camera(s) 112 may generate the image(s) 114 in any format, including but not limited to digital formats such as the Joint Photographic Experts Group (JPEG) standard format, the Graphics Interchange Format (GIF) developed by CompuServe® of Columbus, Ohio, the Portable Network Graphics (PNG) format, and the bitmap image file (BMP) format developed by Microsoft® Corp. of Redmond, Wash. In some cases, the image(s) 114 may be generated in one format and transformed to another format on the user device 102. The camera(s) 112 may detect electromagnetic energy in any frequency range, including visible light, infrared light, ultraviolet light, and so forth, and generate the image(s) 114 that record information in any frequency range. In some implementations, the image(s) 114 are two-dimensional images of at least a portion of the first object 104.

The user device 102 may include one or more depth sensors 116 that generate depth information 118 describing the first object 104. In some implementations, the depth sensor(s) 116 may include one or more three-dimensional sensors configured to acquire three-dimensional data regarding the physical position, size, or configuration of at least a portion of the first object 104. In some implementations, the depth sensor(s) 116 may emit light that illuminates one or more tracking points on at least one surface of the first object 104. The depth sensor(s) 116 may also detect at least a portion of the emitted light that is reflected from the surface(s) of the first object 104. Based on its detection of the reflected light, the depth sensor(s) 116 may calculate a distance between the depth sensor(s) 116 and tracking points on one or more surfaces of the first object 104. The depth sensor(s) 116 may emit light or electromagnetic energy of any frequency, such as infrared energy. The depth sensor(s) 116 may emit any number of beams of light to illuminate any number of tracking points on the surface(s) of the first object 104, and determine the three-dimensional coordinates of any number of tracking points. In some cases, the depth sensor(s) 116 may collect coordinate data to enable the development of a high quality depth map with sub-millimeter accuracy in rendering the surface(s) of the first object 104. Implementations also support other techniques for determining the depth information 118, such as the use of any type of range camera.

While browsing the second object 110 through the user interface 108, the user may generate a composite image request 120. In some implementations, the composite image request 120 may include a second object identifier (ID) 122 that corresponds to the second object 110 browsed by the user. In some cases, the second object ID 122 may uniquely identify the second object 110. The second object ID 122 may include an identifier code, number, alphanumeric string, or any other type of data. In some cases, the second object ID 122 may be a Stock-Keeping Unit (SKU), an International Standard Book Number (ISBN), or any other type of unique identifier. In some implementations, the composite image request 120 may include position information 124 indicating a position in which to display the second object 110 relative to the first object 104 in the composite image. In some cases, the position information 124 may also describe an orientation at which to display the second object 110 relative to the first object 104. The position information 124 may also describe a scale or size to display the second object 110 relative to the first object 104.

The user device 102 may communicate with one or more image processing server devices 126 over a network, and may send the composite image request 120 to the image processing server device 126. The image processing server device 126 may include any type of computing device, including but not limited to a mainframe computer, a server computer, a network computer, a cloud computing server, a distributed computing server, a smartphone, a tablet computer, a wearable computer, an implanted computer, a mobile gaming device, an electronic book reader, an automotive computer, a desktop computer, a personal computer, a laptop computer, a thin client, a terminal, a game console, a smart appliance, a home entertainment device, and so forth. The image processing server device 126 is described further with reference to FIG. 3.

The image processing server device 126 may include an image processing module 128 that executes on the image processing server device 126. Operations of the image processing module 128 are described further with reference to FIGS. 5-11. In some implementations, the image processing module 128 may receive the composite image request 120 including the second object ID 122 from the user device 102. The image processing module 128 may also receive the depth information 118 and the image(s) 114 from the user device 102. In some cases, one or both of the depth information 118 and the image(s) 114 may be stored in memory on the user device 102 and uploaded to the image processing server device 126 when the composite image request 120 is sent to the image processing server device 126, or shortly thereafter. Alternatively, one or both of the depth information 118 and the image(s) 114 may be sent to the image processing server device 126 prior to the sending of the composite image request 120 in anticipation of a possible, future composite image request 120. In some implementations, one or both of the depth information 118 and the image(s) 114 may be uploaded to the image processing server device 126 when a high bandwidth connection is available. For example, one or both of the depth information 118 and the image(s) 114 may be stored on the user device 102 and uploaded when a local area network (LAN), a wide area network (WAN) (e.g., Ethernet), or a wireless LAN (WLAN) (e.g., Wi-Fi™) connection is available between the user device 102 and the image processing server device 126.

After receiving the composite image request 120, the image processing module 128 may search, query, or otherwise access a model datastore 130 to retrieve a model 132 that corresponds to the second object ID 122 and that describes the second object 110. In some cases, the image processing module 128 may query the model datastore 130 using the second object ID 122 as a key. The model datastore 130 may comprise any number of data storage systems that employ any type of data storage technology, including relational databases, non-relational databases, or both relational and non-relational databases. For example, the model datastore 130 may include, but is not limited to, data storage systems managed by any of the following: Oracle®, MySQL®, Lotus Notes®, Lotus Domino®, and Oracle® NoSQL database, from Oracle Corporation® of Redwood City, Calif.; DB2®, from International Business Machines® (IBM) Corporation of Armonk, N.Y.; Linter®, from the RELEX Group® of Voronezh, Russia; FoxPro® database management system, Microsoft Access®, and Microsoft SQL Server®, from Microsoft Corporation® of Redmond, Wash.; PostgreSQL®, from the PostgreSQL Global Development Group; SQLite®, from D. Richard Hipp; ParAccel® Analytic Database, from ParAccel, Incorporated® of San Diego, Calif.; Hadoop® and CouchDB® from the Apache Software Foundation®; or any type of NoSQL database. The model datastore 130 may be stored in local memory of the image processing server device 126, as shown in FIG. 1, or may comprise external data storage relative to the image processing server device 126.

The model 132 of the second object 110 may be a three-dimensional model of the second object 110, and may be in any format. In some implementations, the model 132 may include a plurality of three-dimensional coordinates of points that describe the physical dimensions, extent, shape, or configuration of the second object 110. The model 132 may include data describing a plurality of edges that indicate a physical extent of the second object 110 in one or more directions. The model 132 may include data describing a plurality of polygons that comprise a polygonal mesh, approximating or otherwise describing one or more surfaces of the second object 110. Implementations support polygonal meshes that include any type of polygon, such as a triangle, to describe one or both of the first object 104 and the second object 110. In some cases, one or more models 132 for one or more second objects 110 may be provided by vendors, suppliers, or manufacturers of the second object(s) 110 along with images or other information describing the second object(s) 110 as products to be offered for sale or acquisition through the user application 106.

In some implementations, the image processing module 128 may transform the depth information 118 to generate a first polygonal mesh that describes one or more surfaces of the first object 104. One or more points included in each polygon of the first polygonal mesh may be assigned a color attribute based on the color information in the image(s) 114. In this way, implementations may enable the generation of the model for the first object 104 that combines the three-dimensional depth information 118 with the color information of the image(s) 114. Based on the model 132 of the second object 110, a second polygonal mesh may be determined that describes one or more surfaces of the second object 110. In cases where the model 132 is in the form of coordinate point data or edge data, the information in the model 132 may be analyzed and transformed to determine the second polygonal mesh for the second object 110. In some implementations, color attributes for the second object 110 may be included in the model 132 for the second object 110, and one or more points in each of the polygons of the second polygonal mesh may be assigned a corresponding color attribute. Alternatively, one or more images of the second object 110 may be accessed to determine color information for the second object 110, and points in the polygons of the second polygonal mesh may be assigned color attribute(s) based on the image(s).

The image processing module 128 may virtually arrange one or more polygons of the first polygonal mesh with one or more polygons of the second polygonal mesh, to create a virtual scene that presents at least a portion of the second object 110 with at least a portion of the first object 104. The image processing module 128 may then perform ray tracing operations to generate a plurality of pixels to form a composite image 134 that depicts the first object 104 in a scene with the second object 110. Ray tracing operations are described further with reference to FIGS. 6 and 11.

The composite image 134 may be sent to the user device 102 or other devices via email, Multimedia Messaging Server (MMS) messages, or through other means. In some cases, the composite image 134 may be presented to the user through the user interface 108. The composite image 134 may also be stored in memory on the image processing server device 126. After receiving the composite image 134, the user may examine, store, or share the composite image 134 as described above.

The various devices of the environment 100 may communicate with one another using one or more networks. Such networks may include public networks such as the Internet, private networks such as an institutional or personal intranet, or some combination of private and public networks. The networks may include any type of wired or wireless network, including but not limited to LANs, WANs, wireless WANs (WWANs), WLANs, and mobile communications networks (e.g. 3G, 4G, and so forth). In some implementations, communications between the various devices in the environment 100 may be encrypted or otherwise secured. For example, such communications may employ one or more public or private cryptographic keys, digital certificates, or other credentials supported by a security protocol such as any version of the Secure Socket Layer (SSL) or the Transport Layer Security (TLS) protocol.

Although the example of FIG. 1 depicts generating the composite image 134 in response to the composite image request 120 sent by a user, implementations are not so limited. For example, in some implementations the composite image 134 may be generated and presented to a user as an advertisement or as other information designed to provide the user with information regarding the second object 110. In such cases, the second object 110 may be selected based on one or more characteristics of the user such as demographic information, location, previous purchases, previous browsing habits, and so forth.

Moreover, in some cases the second object 110 may be selected by a user who wishes another user to see what he or she might look like with the second object 110. For example, the composite image request 120 may be received from a first user Anna who indicates a second user Babak as the first object 104, such that the composite image 134 is generated to depict the second object 110 with Babak. In such cases, the composite image 134 may be sent to the first user (e.g., Anna), the second user (e.g., Babak), or both the first and second users.

Although the example of FIG. 1 depicts the image(s) 114 and the depth information 118 respectively generated by the camera(s) 112 and the depth sensor(s) 116 that are incorporated as components of the user device 102, implementations are not so limited. In some implementations, one or more of the image(s) 114 may be generated by one or more cameras that are external to the user device 102, and which may be situated in proximity to the first object 104 to capture the image(s) 114 of the first object 104. Moreover, in some implementations at least a portion of the depth information 118 may be generated by one or more depth sensors that are external to the user device 102, and which may be situated in proximity to the first object 104 to generate the depth information 118 describing the first object 104.

Figure 2:
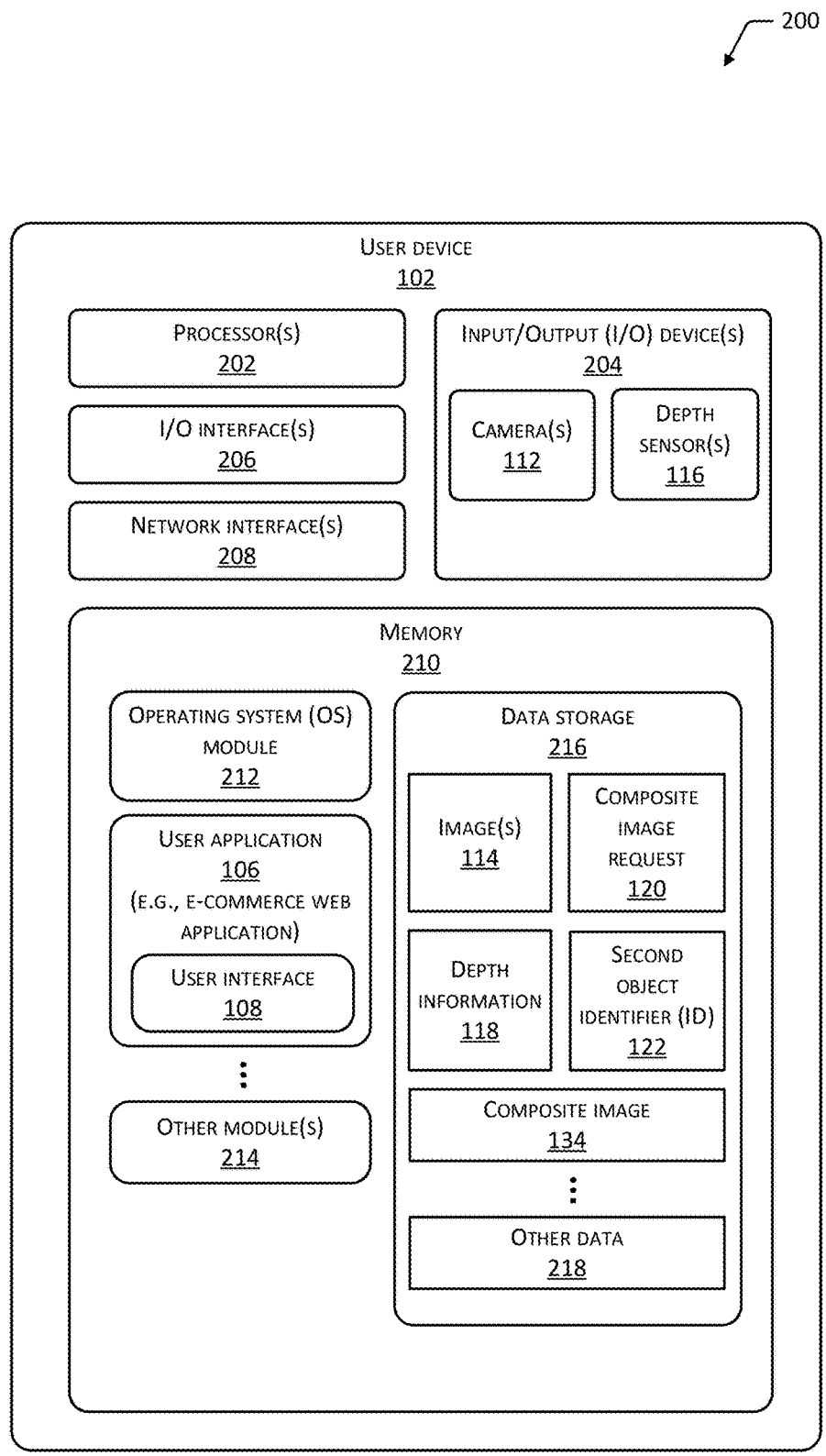
FIG. 2 depicts a block diagram of an example user device configured to generate the image data and the depth information associated with the first object, and to request the composite image depicting the first object with the second object.

FIG. 2 depicts a block diagram 200 of an example user device 102 configured to generate the image(s) 114 and the depth information 118 associated with the first object 104, and to request the composite image 134 depicting the first object 104 with the second object 110. As shown in the block diagram 200, the user device 102 may include one or more processors 202 configured to execute one or more stored instructions. The processor(s) 202 may comprise one or more cores.

The user device 102 may include one or more input/output (I/O) devices 204. The I/O device(s) 204 may include input devices such as a keyboard, a mouse, a pen, a game controller, a touch input device, an audio input device (e.g., a microphone), a gestural input device, a haptic input device, or other devices. The I/O device(s) 204 may include the camera(s) 112, the depth sensor(s) 116, or both the camera(s) 112 and the depth sensor(s) 116, as described above. In some cases, The I/O device(s) 204 may also include output devices such as a display, an audio output device (e.g., a speaker), a printer, a haptic output device, and so forth. The I/O device(s) 204 may be physically incorporated with the user device 102, or may be externally placed.

The user device 102 may include one or more I/O interfaces 206 to enable components or modules of the user device 102 to control, interface with, or otherwise communicate with the I/O device(s) 204. The I/O interface(s) 206 may enable information to be transferred in or out of the user device 102, or between components of the user device 102, through serial communication, parallel communication, or other types of communication. For example, the I/O interface(s) 206 may comply with a version of the RS-232 standard for serial ports, or with a version of the Institute of Electrical and Electronics Engineers (IEEE) 1284 standard for parallel ports. As another example, the I/O interface(s) 206 may be configured to provide a connection over Universal Serial Bus (USB) or Ethernet. In some cases, the I/O interface(s) 206 may be configured to provide a serial connection that is compliant with a version of the IEEE 1394 standard. The user device 102 may also include one or more busses or other internal communications hardware or software that allow for the transfer of data between the various modules and components of the user device 102.

The user device 102 may include one or more network interfaces 208 that enable communications between the user device 102 and other networked devices, such as the image processing server device 126. The network interface(s) 208 may include one or more network interface controllers (NICs) or other types of transceiver devices configured to send and receive communications over a network.

The user device 102 may include one or more memories, described herein as memory 210. The memory 210 comprises one or more computer-readable storage media (CRSM). The CRSM may include one or more of an electronic storage medium, a magnetic storage medium, an optical storage medium, a quantum storage medium, a mechanical computer storage medium, and so forth. The memory 210 provides storage of computer-readable instructions, data structures, program modules, and other data for the operation of the user device 102.

The memory 210 may include an operating system (OS) module 212. The OS module 212 is configured to manage hardware resources such as the I/O device(s) 204, the I/O interface(s) 206, and the network interface(s) 208, and to provide various services to applications, processes, or modules executing on the processor(s) 202. The OS module 212 may include one or more of the following: any version of the Linux® operating system originally released by Linus Torvalds; any version of iOS® from Apple Corp.® of Cupertino, Calif., USA; any version of Windows® or Windows Mobile® from Microsoft Corp.® of Redmond, Wash., USA; any version of Android® from Google Corp.® of Mountain View, Calif., USA and its derivatives from various sources; any version of Palm OS® from Palm Computing, Inc.® of Sunnyvale, Calif., USA and its derivatives from various sources; any version of BlackBerry OS® from Research In Motion Ltd.® of Waterloo, Ontario, Canada; any version of VxWorks® from Wind River Systems® of Alameda, Calif., USA; or other operating systems.

The memory 210 may include the user application 106 as described above with reference to FIG. 1. In some implementations, the user application 106 may include the user interface 108, which is described further with reference to FIG. 4. In cases where the user application 106 is a web application, the memory 210 may include one or more web browsers in which the user application 106 may execute. Implementations support the use of any type of web browser in which the user application 106 may execute. The memory 210 may also include one or more other modules 214, such as a user authentication module or an access control module to secure access to the user device 102, and so forth.

The memory 210 may include data storage 216 to store data for operations of the user device 102. The data storage 216 may comprise a database, array, structured list, tree, or other data structure, and may be a relational or a non-relational datastore. The data storage 216 may store one or more of the following: the image(s) 114, the depth information 118, the composite image request 120, the second object ID 122, or the composite image 134. The data storage 216 may also store other data 218, such as user authentication information or access control data. In some implementations, at least a portion of the information stored in the data storage 216 may be stored externally to the user device 102, on other devices that are accessible to the user device 102 via the I/O interface(s) 206 or via the network interface(s) 208.

Figure 3:
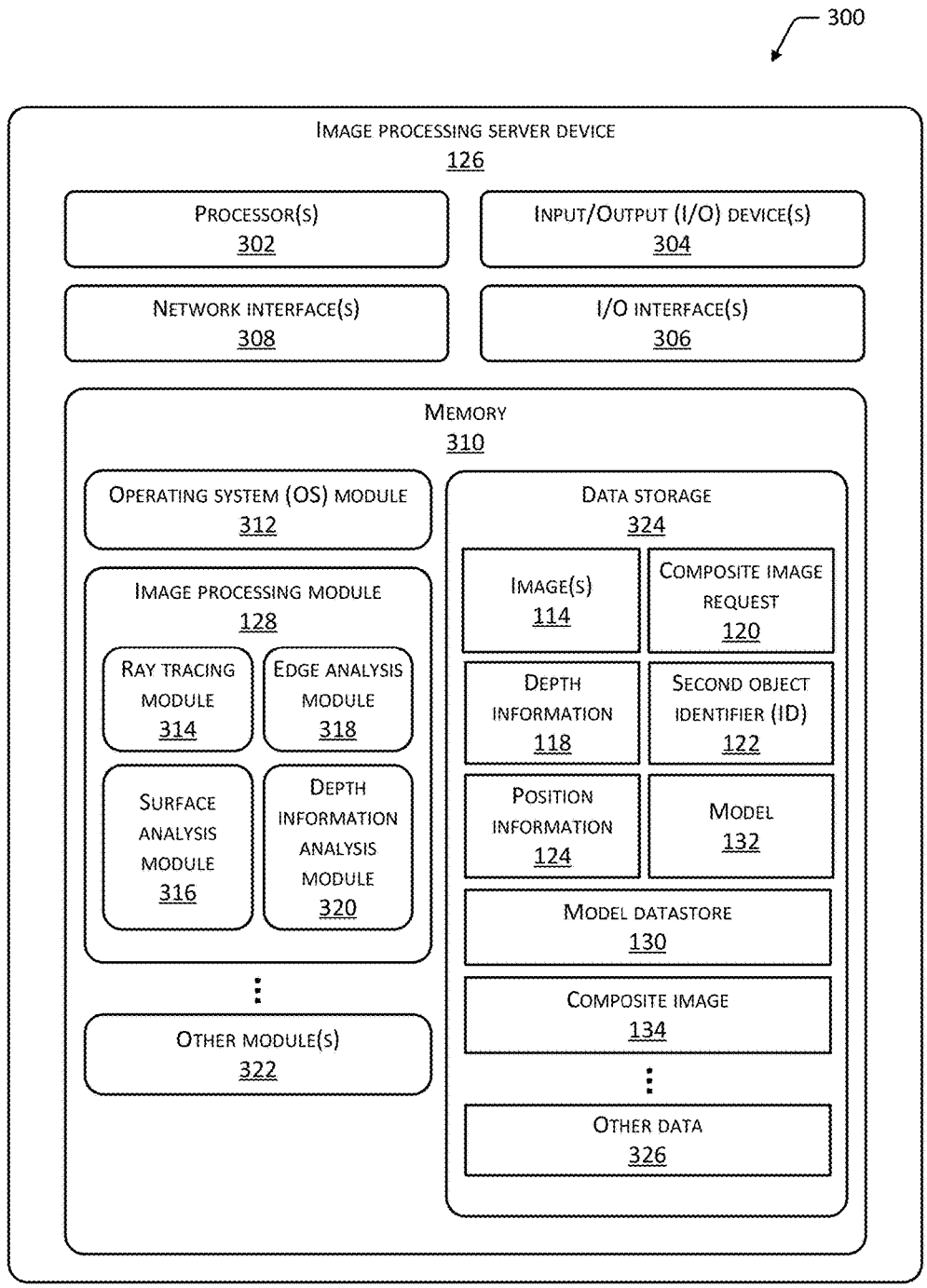
FIG. 3 depicts a block diagram of an example image processing server device configured to generate the composite image based on the image data of the first object, the depth information regarding the first object, and the model of the second object.

FIG. 3 depicts a block diagram 300 of an example image processing server device 126 configured to generate the composite image 134 based on the image(s) 114 of the first object 104, the depth information 118 associated with the first object 104, and the model 132 of the second object 110. As shown in the block diagram 300, the image processing server device 126 may include one or more processors 302 configured to execute one or more stored instructions. The processor(s) 302 may comprise one or more cores. The image processing server device 126 may include one or more I/O devices 304, one or more I/O interfaces 306, and one or more network interfaces 308 as described above with reference to the I/O device(s) 204, the I/O interface(s) 206, and the network interface(s) 208 respectively.

The image processing server device 126 may include one or more memories, described herein as memory 310. The memory 310 comprises one or more CRSM. The CRSM may include one or more of an electronic storage medium, a magnetic storage medium, an optical storage medium, a quantum storage medium, a mechanical computer storage medium, and so forth. The memory 310 provides storage of computer-readable instructions, data structures, program modules, and other data for the operation of the image processing server device 126. The memory 310 may include an OS module 312. The OS module 312 is configured to manage hardware resources such as the I/O device(s) 304, the I/O interface(s) 306, and the network interface(s) 308, and to provide various services to applications, processes, or modules executing on the processor(s) 302. The OS module 312 may include one or more of the operating systems described above with reference to OS module 212.

The memory 310 may include the image processing module 128, which may perform operations as further described with reference to FIGS. 5-11. As shown in the example of FIG. 3, the image processing module 128 may include various sub-components or sub-modules that execute as part of the image processing module 128. For example, the image processing module 128 may include a ray tracing module 314 that performs ray tracing operations such as those described with reference to FIGS. 6 and 11. The image processing module 128 may also include a surface analysis module 316, which may perform operations for combining a first polygonal mesh associated with the first object 104 with a second polygonal mesh associated with the second object 110 to form a virtual scene as described further herein. In some implementations, the image processing module 128 may include an edge analysis module 318. In implementations that employ a model 132 that comprises edge information describing one or more edges of the second object 110, the edge analysis module 318 may perform operations that transform the edge information into a polygonal mesh describing surface(s) of the second object 110.

In some implementations, the image processing module 128 may include a depth information analysis module 320. The depth information analysis module 320 may perform operations to transform the depth information 118, including three-dimensional coordinates for one or more tracking points associated with the first object 104, into a polygonal mesh that describes surface(s) of the first object 104. Although FIG. 3 depicts the ray tracing module 314, the surface analysis module 316, the edge analysis module 318, and the depth information analysis module 320 as sub-components or sub-modules that execute as part of the image processing module 128, implementations are not so limited. In some implementations, one or more of these may execute as separate modules or components relative to the image processing module 128.

The memory 310 may also include one or more other modules 322, such as a user authentication module or an access control module to secure access to the image processing server device 126, and so forth.

The memory 310 may include data storage 324 to store data for operations of the image processing server device 126. The data storage 324 may comprise a database, array, structured list, tree, or other data structure, and may be a relational or a non-relational datastore. The data storage 324 may store one or more of the image(s) 114, the depth information 118, the composite image request 120, the second object ID 122, the model 132 of the second object 110, the virtual module datastore 130, or the composite image 134. The data storage 324 may also store other data 326, such as user authentication information or access control data. In some implementations, at least a portion of the information stored in the data storage 324 may be stored externally to the image processing server device 126, on other devices that are accessible to the image processing server device 126 via the I/O interface(s) 306 or via the network interface(s) 308.

Figure 4:
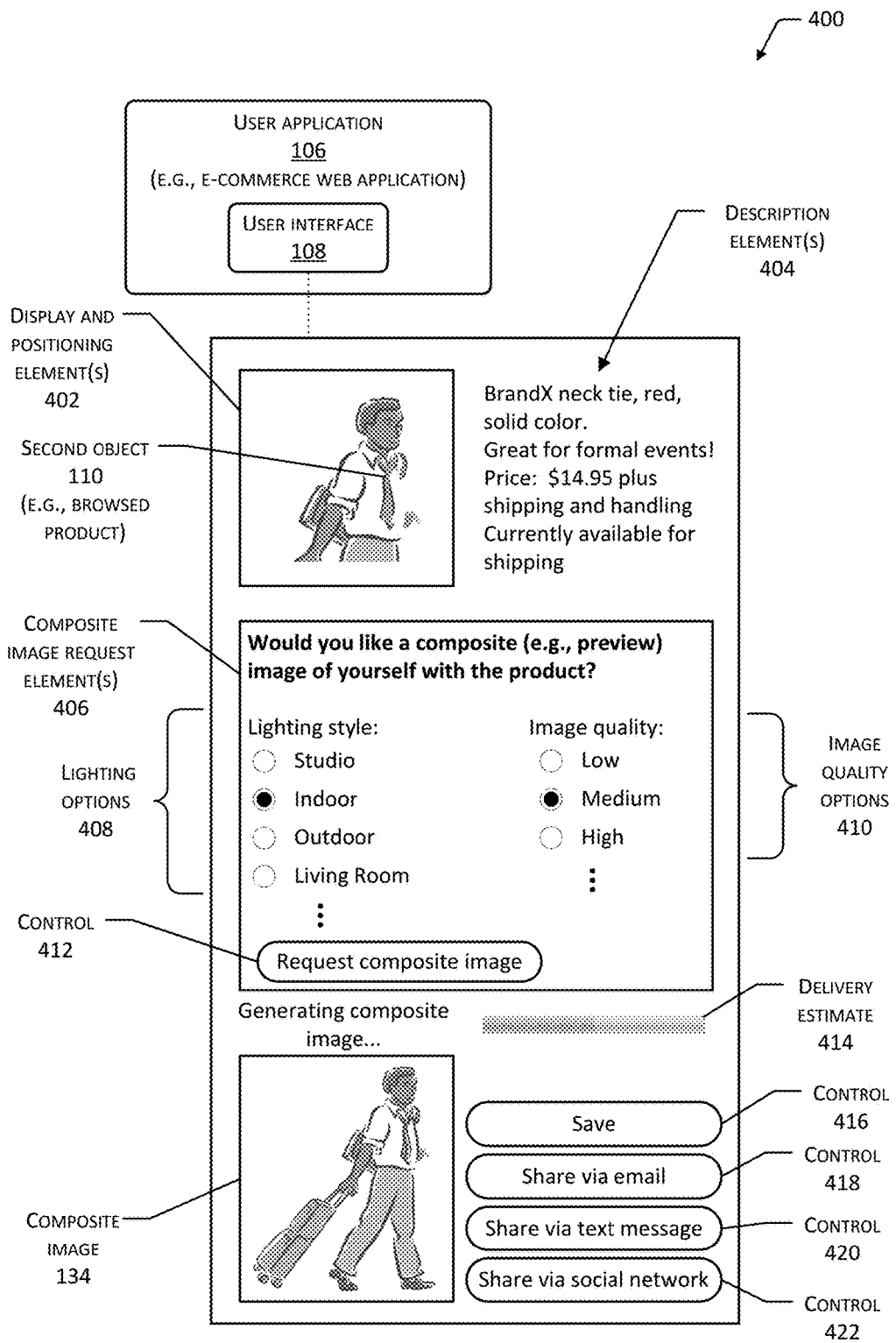
FIG. 4 depicts an example user interface that may be employed by a user to request a composite image of the first object with the second object.

FIG. 4 depicts a schematic 400 of an example of the user interface 108 that may be employed by a user to request the composite image 134 of the first object 104 with the second object 110. In some implementations where the user application 106 is a web application, the user interface 108 may be presented through a web browser.

The user interface 108 may include at least one display and positioning element 402, which may be configured to present one or more images of the second object 110 while the user is browsing the second object 110 through the user interface 108. In some implementations, the display and positioning element(s) 402 presents a preview image of the first object 104 (e.g., the user) with the second object 110. The preview image may be generated by combining at least a portion of a two-dimensional image of the second object 110 with at least a portion of the image 114 of the first object 104. In some implementations, the preview image may be generated substantially in real time as the user is browsing the second object 110. The preview image may be of lower quality than the composite image 134, and may be provided to convey to the user a sense of how the user may look with the second object 110 until the higher quality composite image 134 is generated. In some implementations, the display and positioning element(s) 402 may include interactive elements that enable the user to situate the image of the second object 110 relative to the image of the first object 104. In this way, the user may specify one or more of a position, an orientation, or a scale of the second object 110 relative to the first object 104, and the user's specification of position, orientation, or scale may be included in the position information 124 communicated in the composite image request 120.

The user interface 108 may include at least one description element 404, which may provide a textual description of the second object 110. The textual description may include information regarding price, availability, clothing or apparel size(s), dimension(s), technical specification(s), color(s), design(s), or other characteristics of the second object 110.

In some implementations, the user interface 108 may include one or more composite image request elements 406, which may include one or more controls or other elements that enable a user to request the composite image 134. In the example shown, the composite image request element(s) 406 may include a plurality of selectable lighting options 408. In some implementations, the user may select one or more of the plurality of lighting options 408, and ray tracing operations may be performed based on the user's selection. For example, each of the lighting options 408 may correspond to a number of virtual light sources each having a brightness and a location relative to the virtual scene, and the user's selection of a lighting option 408 may at least partly determine which set of virtual light sources may be used during ray tracing operations. In cases where the user does not select a lighting option, or in implementations where the lighting options 408 are not offered to the user, the ray tracing operations may proceed using one or more default virtual light sources each having a default brightness and a default location relative to the virtual scene. As shown in the example of FIG. 4, the lighting options 408 may each be associated with a description that indicates a type or quality of the lighting, such as studio lighting, indoor lighting, outdoor lighting, living room lighting (e.g., diffuse, bright, ambient lighting), and so forth.

In some implementations, the composite image request element 406 may include a plurality of selectable image quality options 410. In some implementations, the user may select one or more of the plurality of image quality options 410, and ray tracing operations may be performed based on the user's selection. In some cases, each of the image quality options 410 may correspond to a number of virtual light rays employed for ray tracing operations. For example, a "low" option may correspond to one beam of light from each virtual light source to a pixel in a polygon, a "medium" option may correspond to four beams of light per pixel, a "high" option may correspond to ten beams of light per pixel, and so forth.

The composite image request element(s) 406 may also include a control 412, enabling a user to generate and send the composite image request 120 to the image processing server device 126. In some implementations, the composite image request 120 may include the user's selection(s) for the lighting options 408, the image quality options 410, or other options. The composite image request 120 may also include the position information 124 describing the user's preference for the position, orientation, or scale at which to display the second object 110 relative to the first object 104 in the composite image 134. Such position information 124 may be based at least partly on the user's positioning, orienting, or scaling of the second object 110 relative to the first object 104 in the display and positioning element(s) 402 as described above.

After the user has requested the composite image 120, the user interface 108 may display a delivery estimate 414 that provides information indicating when the composite image 120 may be available for viewing by the user. In some cases, the delivery estimate 414 may include a progress bar as in the example shown, indicating the progress toward generating the composite image 120. Alternatively, the delivery estimate 414 may include an estimated time, date, or time and date when the composite image 120 may be provided to the user. In some implementations, the composite image 134 may be sent from the image processing server device 126 and presented within the user interface 108, as shown in the example of FIG. 4. Alternatively, the composite image 134 may be provided to the user via email, MMS message, physical printout, or through other means. In such cases, the user interface 108 may display the lower quality preview image of the user with the second object 110 as described above, while the higher quality composite image 134 is being generated.

In some implementations, the user interface 108 may include one or more controls or other elements enabling the user to save or share the composite image 134. For example, the user interface 108 may include a control 416 enabling the user to save the composite image 134 in a specified location in memory on the user device 102. The user interface 108 may include a control 418 enabling the user to send an email message including the composite image 134 to one or more users. The user interface 108 may include a control 420 enabling the user to send a text message (e.g., MMS message) including the composite image 134 to one or more users. The user interface 108 may include a control 422 enabling the user to share the composite image 134 through one or more social networking web sites or other types of social networks.

Although the example of FIG. 4 depicts the user interface 108 as including various controls in various locations in a single user interface window or view, implementations are not limited to this example. Any type of control may be employed to enable a user to enter information and commands to the user interface 108, including but not limited to buttons, text boxes, radio buttons, slider controls, tree views, list views, pop-up dialogs, and so forth. The controls and other displayed information may be presented in any time sequence, in any position, or in any arrangement, and may be distributed across any number of pages, windows, views, or dialogs.

Figure 5:
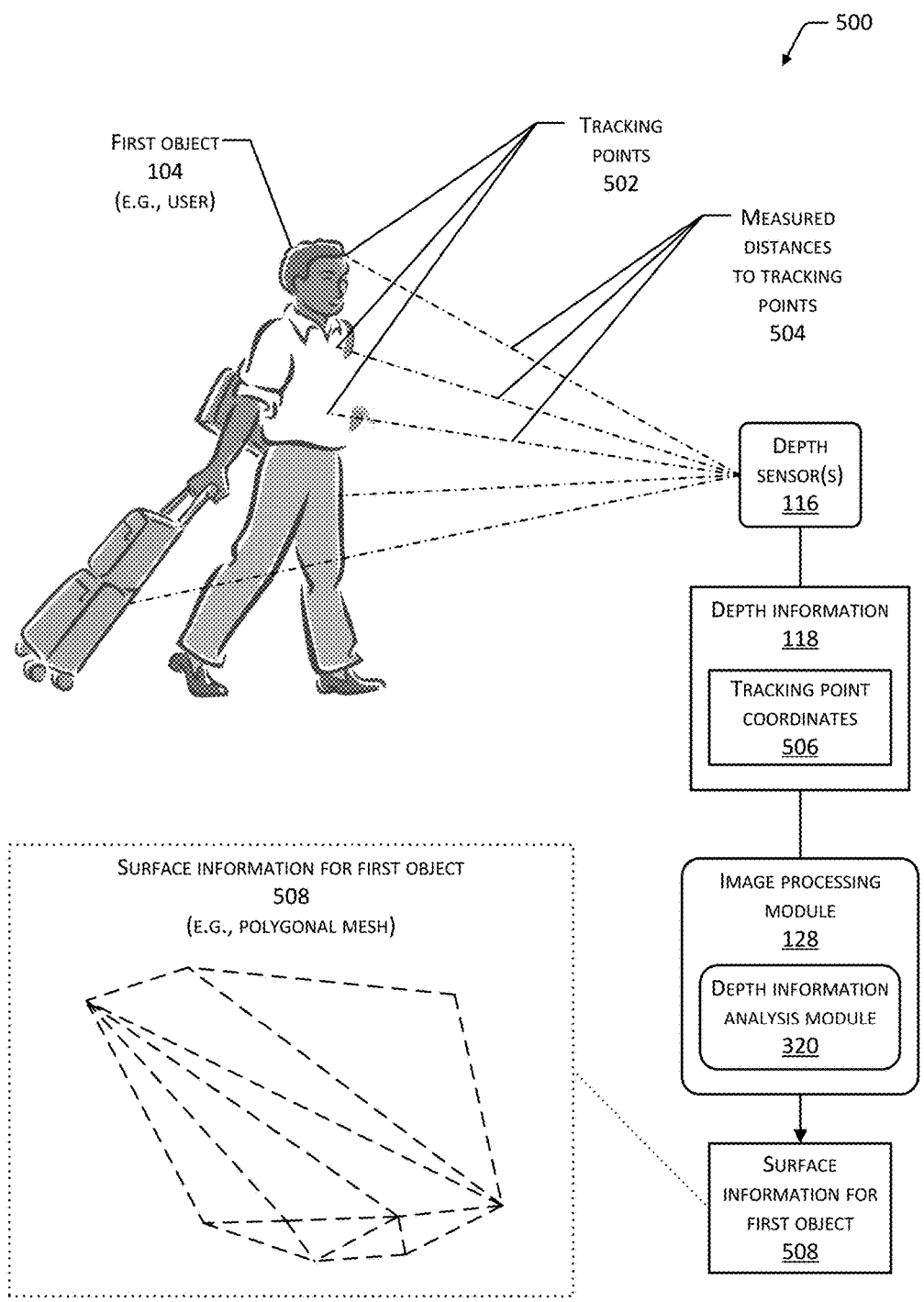
FIG. 5 depicts a schematic illustrating the collection of depth information regarding the first object, and the processing of the depth information to generate a polygonal mesh model of the first object.

FIG. 5 depicts a schematic 500 illustrating the generation of the depth information 118 describing the first object 104, and the processing of the depth information 118 to generate a polygonal mesh model of the first object 104. As described above, the depth sensor(s) 116 of the user device 102 may be configured to acquire three-dimensional data regarding the physical position, size, or configuration of at least a portion of the first object 104. In some implementations, one or more other depth sensors external to the user device 102 may be employed instead of, or in addition to, the depth sensor(s) 116 to generate the depth information 118. The depth sensor(s) 116 or external depth sensors may emit light that illuminates one or more tracking points 502 on at least one surface of the first object 104. The depth sensor(s) may also detect at least a portion of the emitted light that is reflected off the surface(s) of the first object 104. Based on its detection of the reflected light, the depth sensor(s) may determine one or more measured distances to the tracking points 504, as shown in FIG. 5. The measured distances to the tracking points 504 may be analyzed to determine a plurality of tracking point coordinates 506 in three dimensions (e.g., a point cloud). The depth information 118, including the tracking point coordinates 506, may be provided to the image processing module 128 executing on the image processing server device 126.

The image processing module 128, the depth information analysis module 320, or other one or more modules of the image processing server device 126 may analyze the tracking point coordinates 506 and transform or otherwise process the depth information 118 to generate surface information for the first object 508. In some implementations, as in the example shown in FIG. 5, the surface information for the first object 508 may include a polygonal mesh model comprising a plurality of polygons of any type. In some implementations, the polygonal mesh model may employ triangles. The polygonal mesh model may approximate one or more surfaces of the first object 104. One or both of the image processing module 128 and the depth information analysis module 320 may employ one or more surface reconstruction algorithms to transform the tracking point coordinates 506 into the polygonal mesh model that approximates the surface(s) of the first object 104. For example, implementations may employ surface reconstruction techniques provided by the Point Cloud Library (PCL) project. The surface information for the first object 508 may be employed in ray tracing operations to generate the composite image 134, as described below with reference to FIGS. 6 and 11.

In some cases, the tracking point coordinates 506 of the depth information 118 may not provide information regarding all of the surfaces of the first object 104 in three dimensions. For example, in cases where the first object 104 includes a user and the depth sensor(s) 116 are components of the user device 102 held in front of the user, the point cloud for the tracking point coordinates 506 may include information for the front of the user but not the back of the user. In such cases, implementations may interpolate and fill in information for the untracked surfaces of the first object 104. For example, implementations may modify the depth information 118 to add point data describing one or more default (e.g., substantially flat) surfaces that approximate a back portion of a user.

Figure 6:
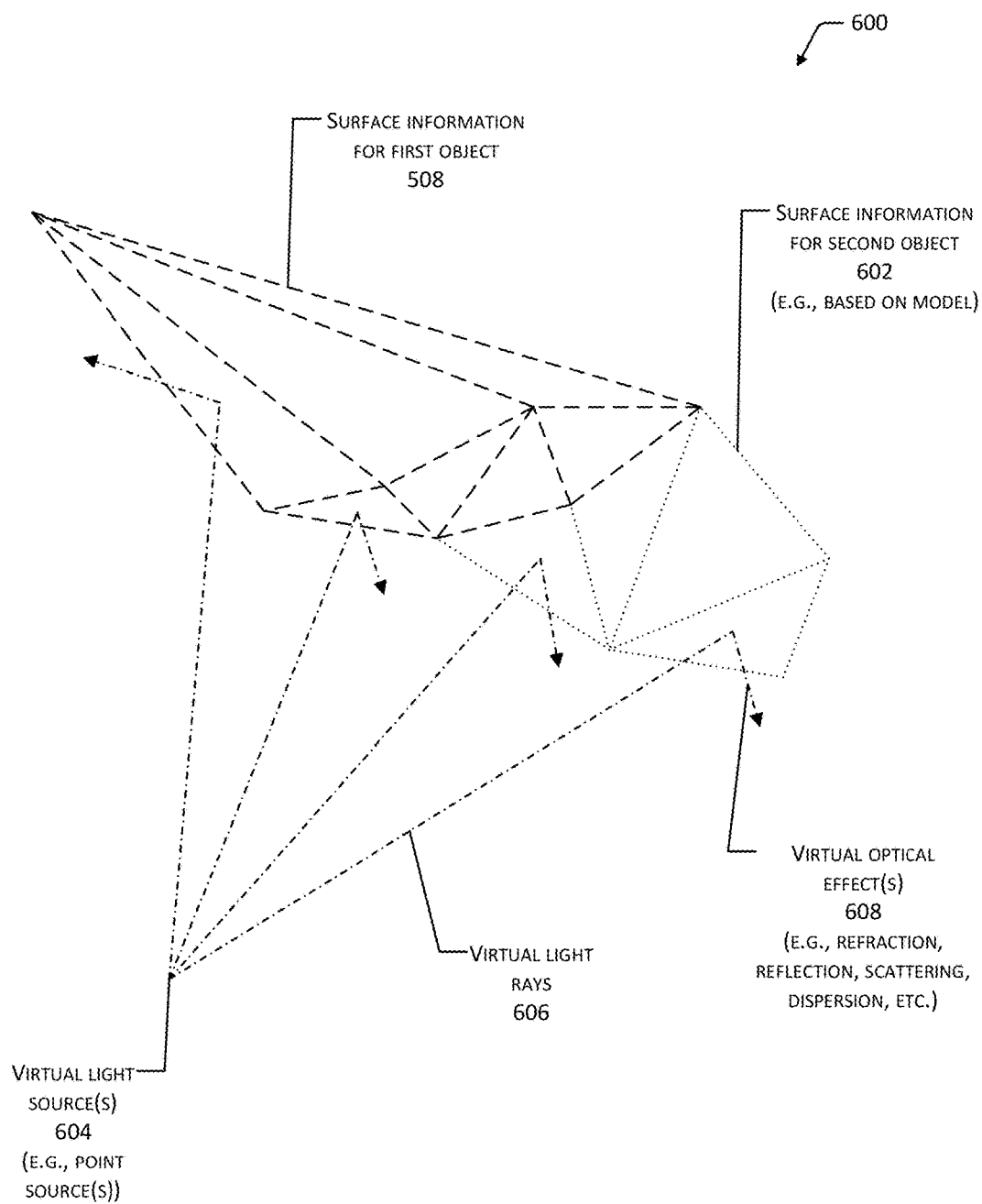
FIG. 6 depicts a schematic illustrating ray tracing operations performed to generate a plurality of pixels that comprise a virtual scene that includes the first object and the second object.

FIG. 6 depicts a schematic 600 illustrating ray tracing operations performed to generate a plurality of pixels that comprise a virtual scene that includes the first object 104 and the second object 110. In some implementations, the image processing module 128, or a sub-module thereof, may determine surface information for the second object 602 based on the model 132 of the second object 110. As shown in the example of FIG. 6, the surface information for the second object 602 may include a plurality of polygons that comprise a polygonal mesh model approximating one or more surfaces of the second object 110. In implementations where the model 132 of the second object 110 includes three-dimensional point data (e.g., a point cloud), the polygonal mesh model approximating one or more surfaces of the second object 110 may be developed using similar methods to those used to generate the surface information for the first object 508. Alternatively, the model 132 may itself include at least a portion of the polygonal mesh model for the second object 110.

The surface information for the first object 508 and the surface information for the second object 602 may be virtually arranged in proximity to one another, to form a virtual scene that depicts at least a portion of the second object 110 with at least a portion of the first object 104. Ray tracing operations may then be performed to generate a plurality of pixels. Ray tracing may employ one or more virtual light sources 604, which may each direct a plurality of virtual light rays 606 toward the polygons corresponding to the first object 104 and the second object 110 in the virtual scene. In some implementations, the virtual light source(s) 604 may be point sources of virtual light. Determination of the virtual light source(s) 604 is further described with reference to FIG. 10.

The plurality of virtual light rays 606 may be directed from the virtual light source(s) 604 toward the polygons approximating the surfaces of the first object 104 and the second object 110 in the virtual scene. Each of the polygons may be intersected by one or more of the virtual light rays 606. Each of the virtual light rays 606 may be at least partly reflected, refracted, scattered, or dispersed on encountering a polygon, and a pixel may be determined based on such optical effects in response to one or more virtual light rays 606 intersecting a point. In some implementations, the optical effects such as the reflectance of each virtual light ray 606 may be determined based on a reflectance model, such as a bidirectional reflectance distribution function (BRDF) which determines how the virtual light ray 606 is reflected by the surface of a polygon. In some implementations, the reflectance model may be a Lambertian reflectance model.

In some implementations, different reflectance models may be employed to simulate the different optical properties of different materials that comprise the first object 104. For example, in cases where the first object 104 is at least a portion of a user, a first reflectance model may be employed for those polygons corresponding to the user's skin and a second reflectance model may be employed for those polygons corresponding to the user's clothing, hair, spectacles, and so forth. Implementations may employ various methods to infer the material composition of various portions of the surfaces of the first object 104. In some implementations, image analysis techniques such as facial recognition or other object recognition algorithms may be employed to analyze the image(s) 114. Such techniques may estimate a probability that a particular portion of an object is skin, hair, clothing, and so forth. Different reflectance models may be applied to various polygons of the first object 104 based on the estimated composition of a portion of the surface corresponding to the polygons.

Alternatively, in some implementations a spectroscopic analysis may be performed on the light that is reflected from the surface(s) of the first object 104 and detected by the depth sensor(s) 116 as described above. Based on the spectroscopic analysis, a determination may be made of the materials that compose at least a portion of one or more surfaces of the first object 104. Different reflectance models may be applied to various polygons for the first object 104 based on the estimated composition of a portion of the surface corresponding to the polygon. Implementations support applying reflectance models to polygons based on one or both of the image analysis and spectroscopic methods described above. Alternatively, implementations may employ one or more predetermined reflectance models (e.g., a Lambertian model) for the polygons corresponding to the first object 104.

In some implementations the reflectance or other optical properties of the polygons corresponding to the second object 110 may be based on the composition of one or more surfaces of the second object 110. Such composition information for the second object 110 may be provided by a merchant, manufacturer, vendor, or other party that provides the second object 110, or that provides images and descriptions of the second object 110 for presentation through the user application 106.

One or more virtual light rays 606 may determine a pixel based on one or more virtual optical effects 608 of the intersection of the virtual light ray(s) 606 with a point included in a polygon. The virtual optical effect(s) 608 may include refraction, reflection, scattering, dispersion, or other effects. In some implementations, a color may be assigned to each pixel based on the color information included in the images 114. For example, the images 114 may show that a particular portion of the first object 104 is a particular color. The polygon(s) corresponding to that particular portion, and the pixels included in the polygon(s), may be assigned that color. Each pixel may have one or more associated values that correspond to a color of the pixel. For example, a pixel may be associated with three values that indicate color within a red-green-blue (RGB) color description. Each pixel may also have other associated values that correspond to characteristics for brightness, reflectance, transparency, or other optical properties.

In some implementations, as in the example of FIG. 6, polygons describing surfaces of both the first object 104 and the second object 110 may be placed in a virtual scene. Ray tracing operations may analyze the incidence of the virtual light rays 606 against polygons of both the first object 104 and the second object 110 to determine characteristics of pixels to include in the composite image 134. Such implementations are described further with reference to FIG. 11. Alternatively, in some implementations the virtual scene may be composed of the image(s) 114 of the first object 104 and polygons describing surfaces of the second object 110.

In such cases, ray tracing operations may analyze the incidence of the virtual light rays 606 against polygons of the second object 110 to determine characteristics of pixels. The pixels may then be combined with the image(s) 114 to generate the composite image 134. Such implementations are described further with reference to FIG. 12.

Figure 7:
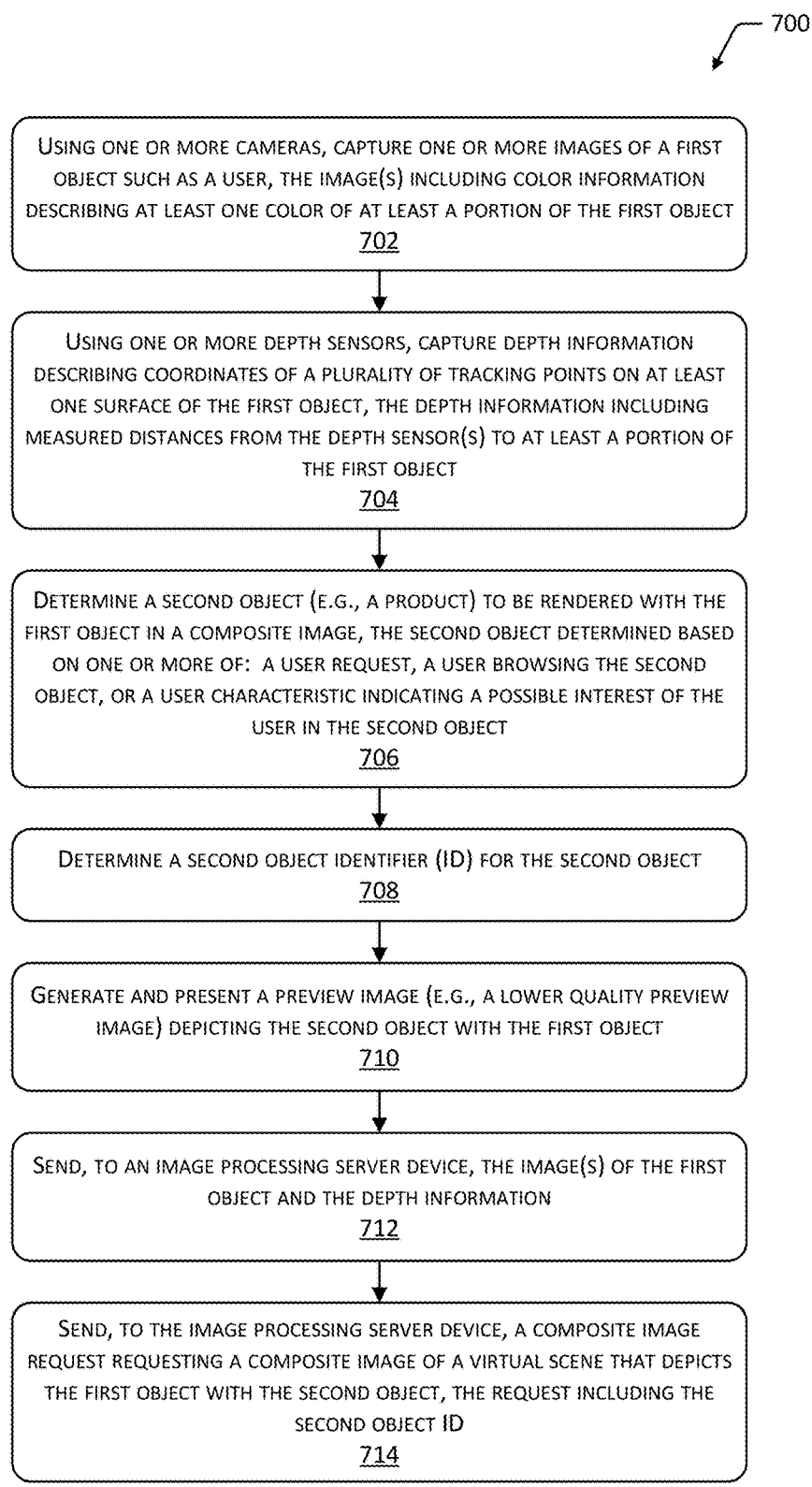
FIG. 7 depicts a flow diagram of a process for generating image data and depth information associated with the first object, and requesting a composite image depicting the first object with the second object.

FIG. 7 depicts a flow diagram 700 of a process for generating the image(s) 114 and the depth information 118 associated with the first object 104, and requesting the composite image 134 depicting the first object 104 with the second object 110. Operations of the process may be performed by one or more components or modules of the user device 102.

At 702, the image(s) 114 of the first object 104 may be captured using one or more cameras. As described above, the image(s) 114 may be captured using the camera(s) 112 included in the user device 102 or by at least one external camera that has the first object 104 in its field of view. As described above, the image(s) 114 may include color information describing at least one color of at least a portion of the first object 104.

At 704, the depth information 118 associated with the first object 104 may be generated using one or more depth sensors. As described above, the depth information 118 may be generated using the depth sensor(s) 116 included in the user device 102 or by at least one external depth sensor in proximity to the first object 104. As described above with reference to FIG. 5, the depth information 118 may include a plurality of tracking point coordinates 506 that provide three-dimensional coordinates for a plurality of points on the surface(s) of the first object 104, the tracking point coordinates based at least partly on an analysis of the measured distances to the tracking points 504.

At 706, a determination is made of the second object 110 (e.g., a product) to be rendered with the first object 104 in the composite image 134. In some implementations, the second object 110 may be determined based on a user's request for a composite image 134 showing the second object 110 with the first object 104, or based on the user browsing the second object 110 through the user application 106, as described above with reference to FIG. 4. In some implementations, the second object 110 may be automatically determined based at least partly on one or more user characteristics indicating the user's possible interest in the second object 110. For example, if a user's past purchasing habits or browsing patterns indicate the user's interest in camping or the outdoors, a camp stove may be automatically identified as the second object 110. The user may then be presented with an advertisement or other notification including the composite image 134 that depicts the user with the camp stove.

At 708, the second object ID 122 may be determined. In some implementations, the second object ID 122 may be available to the user application 106 while the user is browsing the second object 110. Alternatively, the second object ID 122 may be retrieved from a product database or other data storage system.

At 710, in some implementations a preview image may be generated that depicts the second object 110 with the first object 104. The preview image may be a lower quality image than the composite image 134 and may be generated substantially in real time as the user is browsing the second object 110. The preview image may be presented through the user interface 108 and may be manipulated by the user to specify position information for the second object 110 relative to the first object 104, as described above with reference to FIG. 4.

At 712, the image(s) 114 and the depth information 118 associated with the first object 104 may be sent to the image processing server device 126. At 714, the composite image request 120 may be sent to the image processing server device 126. As described above, the composite image request 120 may request that the composite image 134 be generated depicting the first object 104 in a virtual scene with the second object 110. The composite image request 120 may include the second object ID 122.

In some cases, one or both of the depth information 118 and the image(s) 114 may be sent to the image processing server device 126 when the composite image request 120 is sent to the image processing server device 126, or shortly thereafter. Alternatively, one or both of the depth information 118 and the image(s) 114 may be sent to the image processing server device 126 prior to the sending of the composite image request 120 in anticipation of a possible, future composite image request 120. As describe above, one or both of the depth information 118 and the image(s) 114 may be uploaded to the image processing server device 126 when a high bandwidth connection is available.

To ensure user privacy, implementations may provide an opt-in mechanism by which the image(s) 114 and the depth information 118 regarding the first object 104 are generated based on an explicit request by the user that such information be generated. Alternatively, implementations may provide an opt-out mechanism by which the generation of image(s) 114 and the depth information 118 is suspended based on the user's request that data collection be suspended on the user device 102. To ensure security of the user information, in some implementations the image(s) 114 and the depth information 118 may be communicated from the user device 102 to the image processing server device 126 using communications that are secured through SSL, TLS, or through other means.

Figure 8:
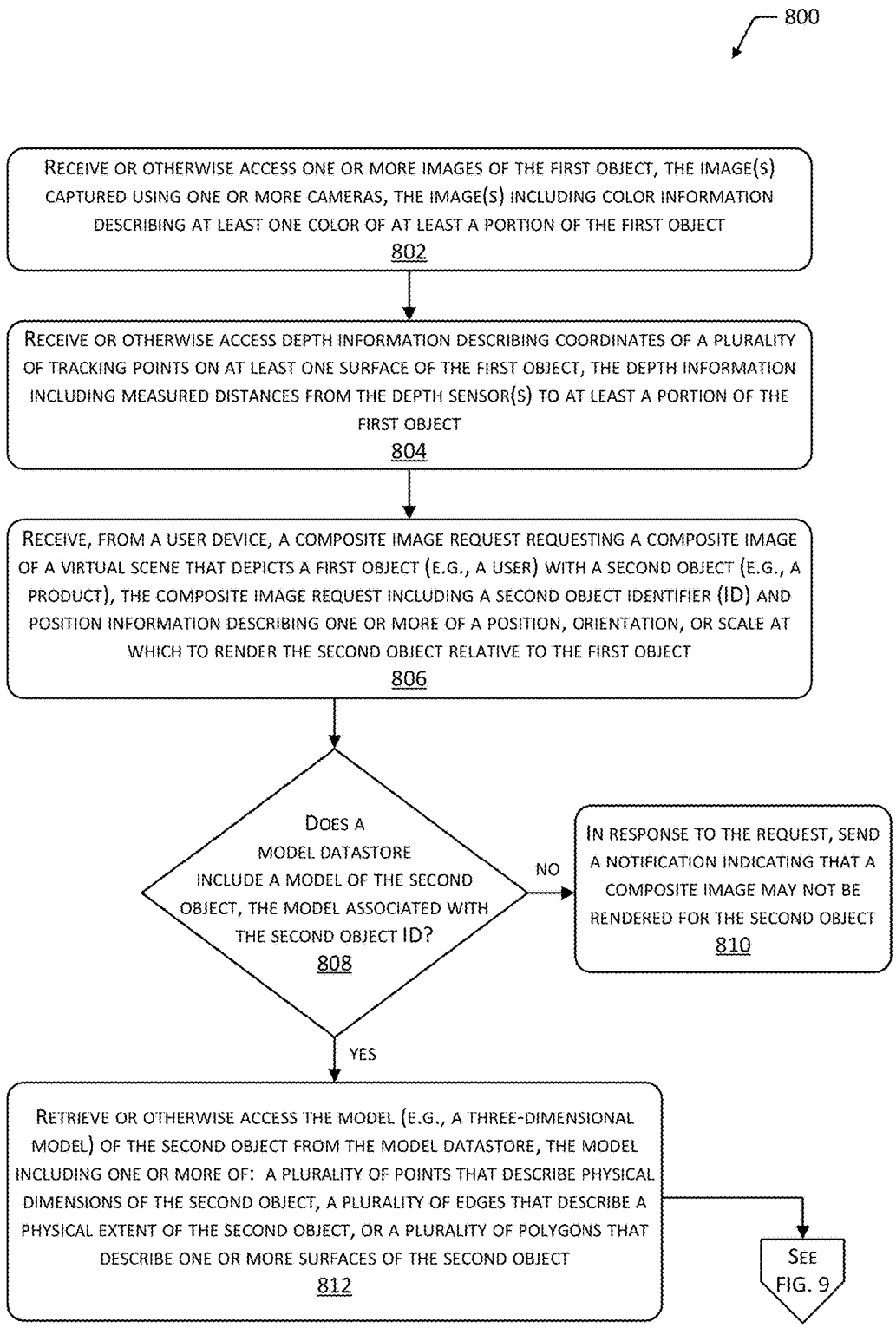
FIG. 8 depicts a flow diagram of a process for generating the composite image depicting the first object with the second object, based on the image data and the depth information associated with the first object, and based on a model of the second object.

FIG. 8 depicts a flow diagram 800 of a process for generating the composite image 134 depicting the first object 104 with the second object 110. Operations of the process may be performed by the image processing module 128, by other modules executing on the image processing server device 126, or by other modules executing on other devices.

At 802, the image(s) 114 of the first object 104 may be received from the user device 102. Alternatively, the image(s) 114 may have been previously received and stored in memory on the image processing server device 126 or elsewhere, and the image(s) 114 may be accessed from memory. As described above, the image(s) 114 may be captured using one or more cameras and may include color information describing one or more colors of the first object 104.

At 804, the depth information 118 associated with the first object 104 may be received from the user device 102. Alternatively, the depth information 118 may have been previously received and stored in memory on the image processing server device 126 or elsewhere, and the depth information 118 may be access from memory. As described above, the depth information 118 may describe a plurality of tracking point coordinates 506 for points on surface(s) of the first object 104.

At 806, the composite image request 120 may be received, including the second object ID 122. In some implementations, the composite image request 120 may also include the position information 124 indicating one or more of the position, the orientation, or the scale at which to render the second object 110 relative to the first object 104 in the composite image 134, as described above.

At 808, a determination is made whether the model datastore 130 includes the model 132 of the second object 110, the model 132 associated with the second object ID 122. As described above, in some cases this determination may be made based on searching or querying the model datastore 130 using the second object ID 122 as a key or search value. If the model datastore 130 does not include the model 132 of the second object 110, the process may proceed to 810. At 810, a notification may be sent to the user device 102 in response to the composite image request 120, the notification indicating that a composite image may not be rendered for the identified second object 110. In such cases, the lower quality preview image may be presented to provide the user with information regarding how he or she may look with the second object 110, as described above with reference to FIG. 4. If the model datastore 130 does include the model 132 of the second object 110, the process may proceed to 812.

At 812, the model 132 of the second object 110 may be retrieved from the model datastore 130 or otherwise accessed. As described above, the model 132 of the second object 110 may be a three-dimensional model of the second object 110, and may be in any format. In some implementations, the model 132 may include a plurality of three-dimensional coordinates of points that describe the physical dimensions, extent, shape, or configuration of the second object 110. The model 132 may include data describing a plurality of edges that indicate a physical extent of the second object 110 in one or more directions. The model 132 may include data describing a plurality of polygons that comprise a polygonal mesh model approximating or otherwise describing one or more surfaces of the second object 110, such as the surface information for the second object 602 shown in FIG. 6. Implementations may employ one or more of these types of models in any combination.

Figure 9:
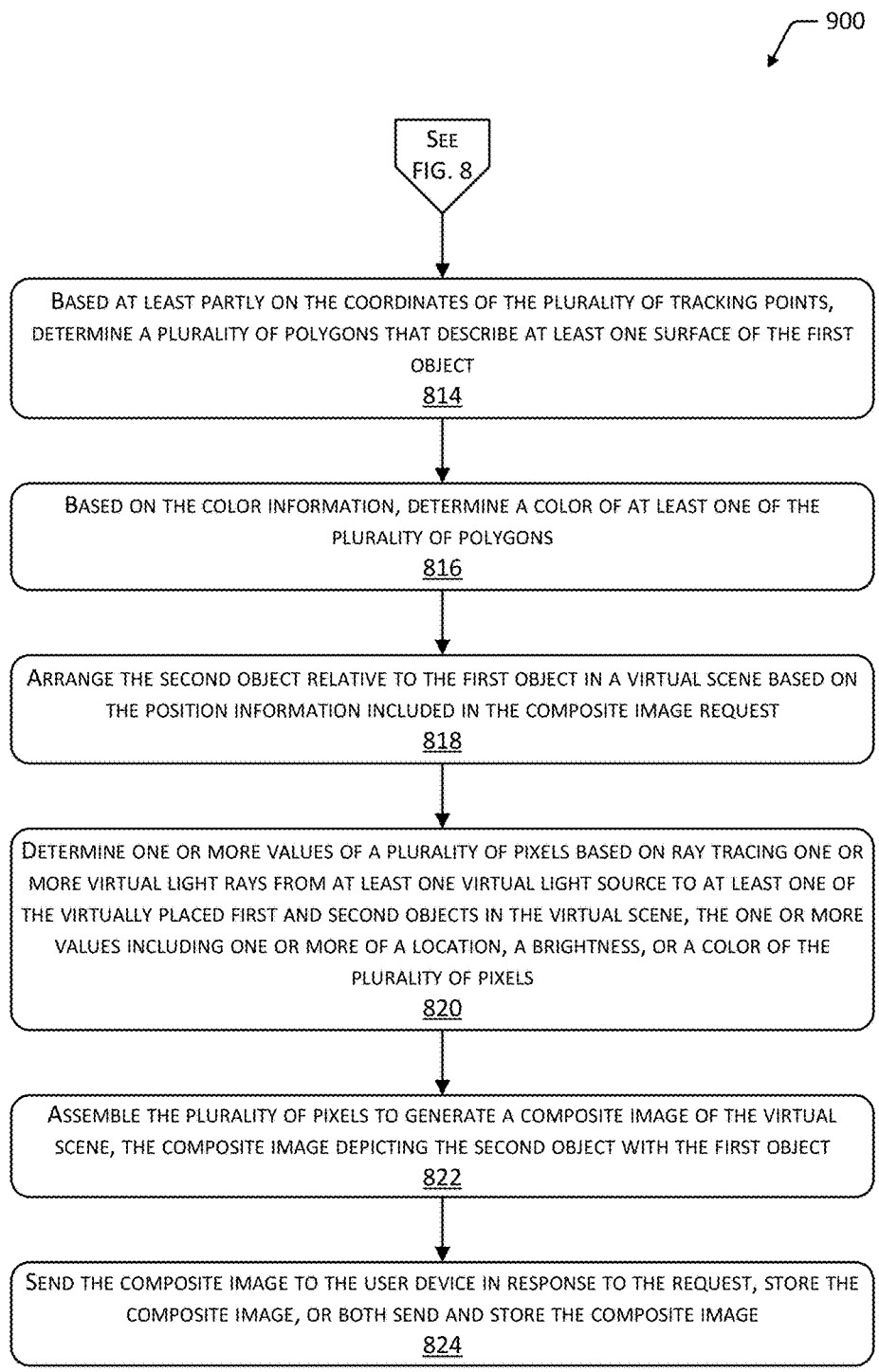
FIG. 9 depicts a continuation of the flow diagram of FIG. 8, describing the process for generating the composite image of the first object with the second object.

The flow diagram 800 continues in FIG. 9. At 814, based at least partly on the tracking point coordinates 506 included in the depth information 118, a plurality of polygons may be determined that describe or approximate at least a portion of at least one surface of the first object 104. As described above with reference to FIG. 5, the plurality of polygons may comprise a polygonal mesh model. At 816, based on the color information included in the image(s) 114, a color may be determined for one or more of the plurality of polygons for the first object 104.

At 818, a virtual scene may be composed that includes the second object 110 and the first object 104, as described above with reference to FIG. 6. The virtual placement or arrangement of the first object 104 and the second object 110 may include arranging, in one or more data structures or objects in memory, information that describes the first object 104 with information that describes the second object 110. In some implementations, the second object 110 may be placed or otherwise arranged at a position, orientation, or scale in the virtual scene relative to the first object 104, based at least in part on the position information 124 specified by a user in the composite image request 120.

As described above, in some implementations a polygonal mesh model of the second object 110 may be determined based on the model 132, and the virtual scene may be composed by virtually arranging one or more polygons for the first object 104 in proximity to one or more polygons for the second object 110. Ray tracing operations may then be performed on the polygons of both the first object 104 and the second object 110. Such implementations are described further with reference to FIG. 11. Alternatively, in some implementations the virtual scene may be composed by virtually arranging polygons of the polygonal mesh model of the second object 110 with the image(s) 114 of the first object 104. Ray tracing operations may then be performed on the polygons of the second object 110. Such implementations are described further with reference to FIG. 12.

At 820, one or more characteristics of a plurality of pixels may be determined based on ray tracing operations. The one or more characteristics may include one or more of a location, a brightness, or a color of the plurality of pixels. Implementations may also determine other characteristics for the plurality of pixels. As further described above with reference to FIG. 6, and below with reference to FIGS. 11 and 12, the ray tracing may include tracing a plurality of virtual light rays 606 from one or more virtual light sources 604 to points on surfaces of at least one of the virtually placed first object 104 and second object 110, e.g., to at least some of the polygons corresponding to the first object 104 and the second object 110. At 822, the plurality of pixels generated via the ray tracing operations may be assembled to generate the composite image 134 of the virtual scene depicting the second object 110 with the first object 104. At 824, the composite image 134 may be sent to the user device 102 in response to the composite image request 120, or sent to a user who formulated the composite image request 120. In some cases, the composite image 134 may be stored in memory on the image processing server device 126, on the user device 102, or elsewhere.

Figure 10:
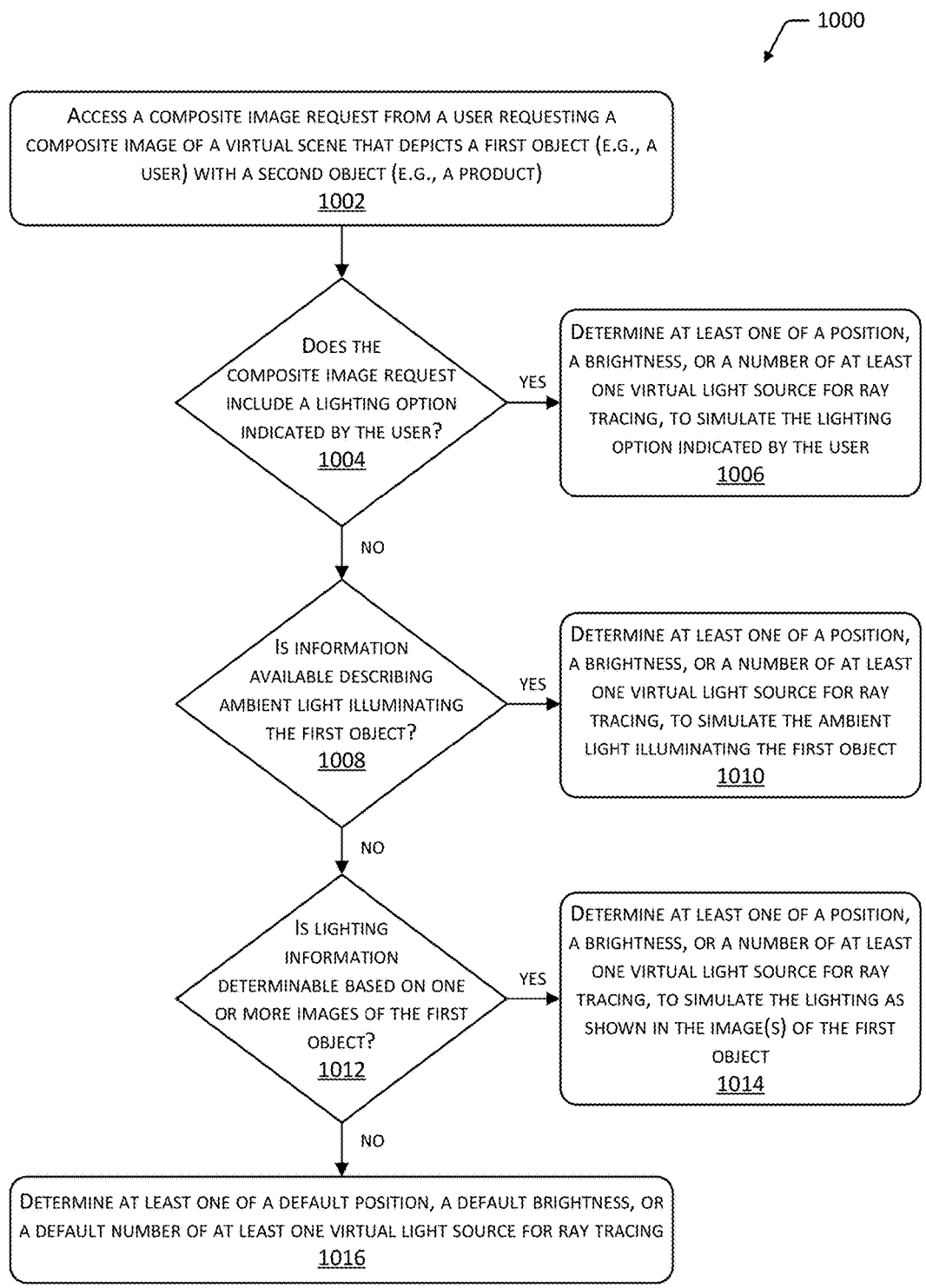
FIG. 10 depicts a flow diagram of a process for determining one or more virtual light sources for ray tracing operations to generate the composite image.

FIG. 10 depicts a flow diagram 1000 of a process for determining the one or more virtual light sources 604 for ray tracing operations to generate the composite image 134. Operations of the process may be performed by the image processing module 128, the ray tracing module 314, other modules of the image processing server device 126, or other modules executing on other devices.

At 1002, the composite image request 120 is received or otherwise accessed. In some implementations, the number, brightness, and location of the virtual light source(s) 604 relative to the virtual scene may be determined based on options selected by a user through the user interface 108, as described above with reference to FIG. 4. At 1004, a determination is made whether the composite image request 120 includes a lighting option specified by the user, or whether a lighting option or preference has been otherwise indicated by the user. If so, then the process may proceed to 1006. At 1006, at least one of a position, a brightness, or a number of the virtual light source(s) 604 is determined to simulate the lighting option(s) indicated by the user. If the user has not specified a lighting option, the process may proceed to 1008.

In some implementations, the user device 102 or other devices may include one or more ambient light sensors that detect and measure ambient light illuminating the first object 104, and information describing the ambient light may be provided to the image processing module 128. At 1008, a determination is made whether information is available that describes the ambient light illuminating the first object 104. If so, the process may proceed to 1010. At 1010, at least one of a position, a brightness, or a number of the virtual light source(s) 604 may be determined to simulate the measured ambient light illuminating the first object 104. If ambient light information is not available, the process may proceed to 1012.

At 1012, a determination may be made whether lighting information is determinable based on the image(s) 114 of the first object 104. In some implementations, the image(s) 114 may be analyzed to identify and characterize one or more light sources that illuminated the scene in which the image(s) 114 were captured. Such analysis may include identifying one or more portions of the image(s) 114 that exhibit a higher level of reflected light than other portions. Such bright spots may be employed to determine a location, brightness, spectroscopic characteristics, or other characteristics of one or more light sources that illuminated the scene in which the image(s) 114 were captured. In such cases, triangulation or other mathematical operations may be employed to determine the location of the light sources. Alternatively, the image(s) 114 may be analyzed to determine a variance of reflected light along one or more surfaces (e.g., curved surfaces) of the first object 104 depicted in the image(s) 114. Such variance may be employed to estimate or otherwise determine a location, a brightness, spectroscopic characteristics, or other characteristics of the one or more light sources that illuminated the scene.

If it is determined at 1012 that lighting information is determinable based on the image(s) 114, the process may proceed to 1014. Otherwise, the process may proceed to 1016. At 1014, at least one of a position, a brightness, or a number of the virtual light source(s) 604 may be determined to simulate the ambient light as depicted in the image(s) 114.

At 1016, the virtual light source(s) 604 may be determined based on at least one of a default position, a default brightness, or a default number of virtual light sources 604. For example, a single virtual light source 604 may be employed by default, assigned a default brightness, and placed in a default position such that its virtual light ray(s) 606 are substantially perpendicular to one or more surfaces of the first object 104 or the second object 110. In some implementations, multiple default lighting options of varying brightness, diffuseness, or other characteristics may be employed to generate multiple composite images 134 with varying lighting characteristics.

Figure 11:
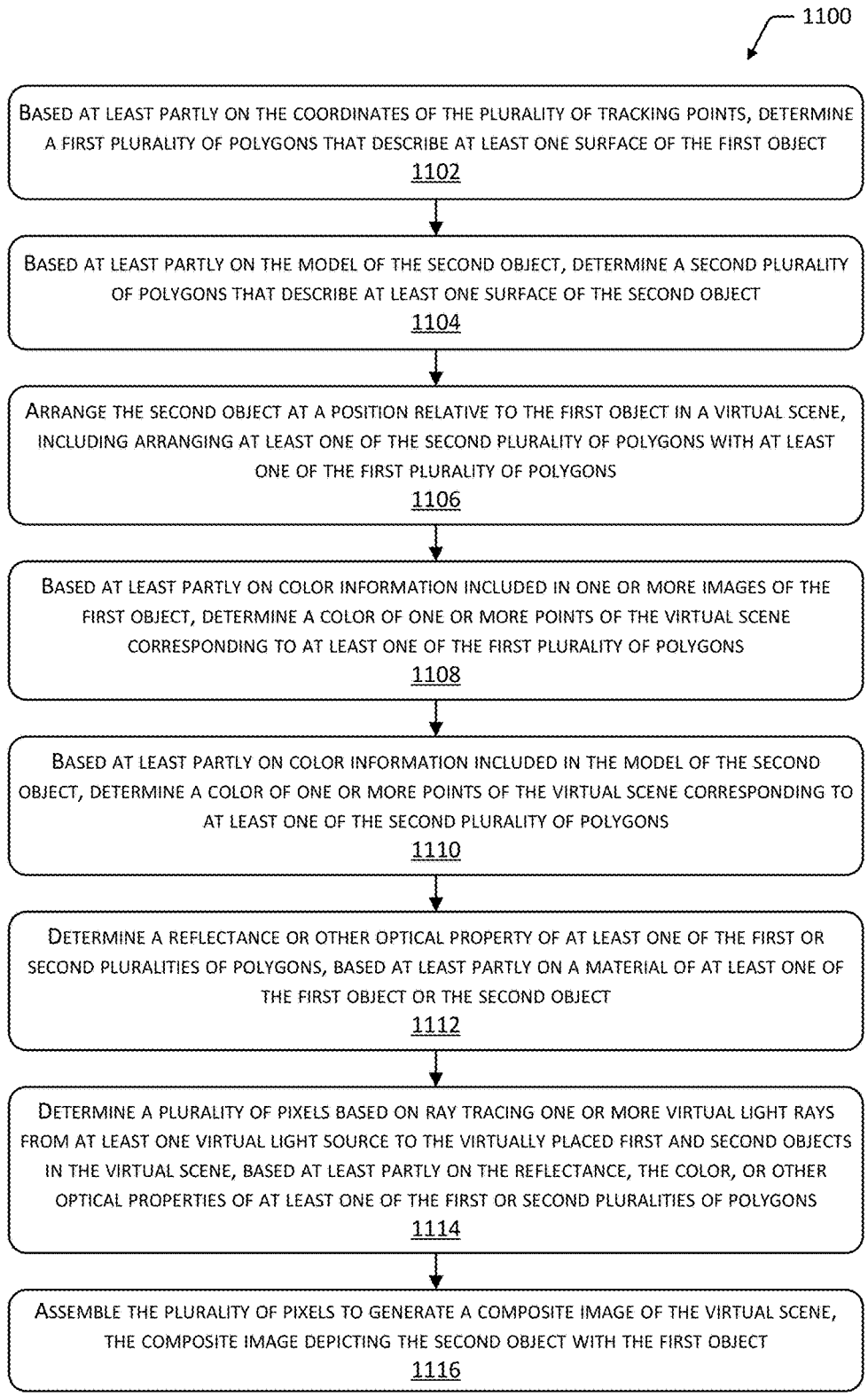
FIG. 11 depicts a flow diagram of a process for performing ray tracing operations to generate the composite image, employing polygonal mesh models of both the first and second objects.

FIG. 11 depicts a flow diagram 1100 of a process for performing ray tracing operations to generate the composite image 134, employing polygonal mesh models of both the first object 104 and the second object 110. Operations of the process may be performed by the image processing module 128, the ray tracing module 314, other modules of the image processing server device 126, or other modules executing on other devices.

At 1102, based at least partly on the tracking point coordinates 506 included in the depth information 118, a first plurality of polygons may be determined that describe or approximate at least a portion of at least one surface of the first object 104. As described above with reference to FIG. 5, the plurality of polygons may comprise a polygonal mesh model.

At 1104, based at least partly on the model 132 a second plurality of polygons may be determined that describe at least one surface of the second object 110. In some cases the model 132 may itself include a polygonal mesh model of the second object 110, including the second plurality of polygons. Alternatively, in cases where the model 132 includes point cloud data or edge information, the model 132 may be transformed to a polygonal mesh model for the second object 110 as described above.

At 1106, the second object 110 may be arranged in a virtual scene with the first object 104. In some implementations, this virtual placement may include virtually arranging at least one of the first plurality of polygons corresponding to the first object 104 in the virtual scene with at least one of the second plurality of polygons corresponding to the second object 110. In some implementations, the position of the second object 110 relative to the first object 104 in the virtual scene may be based at least partly on the position information 124 included in the composite image request 120, and such position information may be indicated by the user through the user interface 108 as described above with reference to FIG. 4. Alternatively, the position of the second object 110 relative to the first object 104 may be inferred based on a likely use or purpose of the second object 110. For example, if the second object 110 is a wrist watch and the first object 104 is at least a portion of the user, the position of the second object 110 may be determined as on or near a wrist of the user.

At 1108, based at least partly on the color information included in the image(s) 114 of the first object 104, a color may be determined for one or more points of the virtual scene that are in one or more of the first plurality of polygons for the first object 104. For example, if a color analysis of the image(s) 114 determines that a particular portion of a surface of the first object 104 has a particular color, one or more points in one or more polygons corresponding to that portion of the surface may be assigned the color.

At 1110, based at least partly on color information included in the model 132 of the second object 110, a color may be determined for one or more points of the virtual scene that are in one or more of the second plurality of polygons for the second object 110. Alternatively, the model 132 may not include color information for the second object 110. In such cases, the color(s) for the second object 110 may be determined based on an analysis of one or more images of the second object 110, the analysis proceeding similarly to that described with reference to 1108.

At 1112, a reflectance or other optical properties may be determined for one or more polygons in the first and second pluralities of polygons. In some cases, the reflectance may be determined based at least partly on a material composition of the first object 104, the second object 110, or both. As described above with reference to FIG. 6, the material composition of the first object 104 or the second object 110 may be based on a spectroscopic analysis, on object recognition or other types of image analysis, or through other means.

At 1114, ray tracing operations may be performed to determine a plurality of pixels. As described above with reference to FIG. 6, the ray tracing may include virtually tracing a path of one or more virtual light rays 606 from at least one virtual light source 604 to the first and second pluralities of polygons corresponding to the first object 104 and the second object 110 in the virtual scene. The optical effects (e.g., reflection, refraction, scattering, or dispersion) of the virtual light rays 606 interacting with the polygons may be analyzed to determine a pixel corresponding to a point on the surface(s) where one or more virtual light rays 606 intersect the surface(s). In some implementations, as described above with reference to FIG. 6, such optical effects may be determined based one or more reflectance models applied to the polygons. The reflectance model for each polygon may be determined based on an inferred or otherwise determined material composition of a portion of a surface corresponding to the polygon.

At 1116, the plurality of pixels may be assembled to generate the composite image 134 that depicts the second object 110 with the first object 104.

Figure 12:
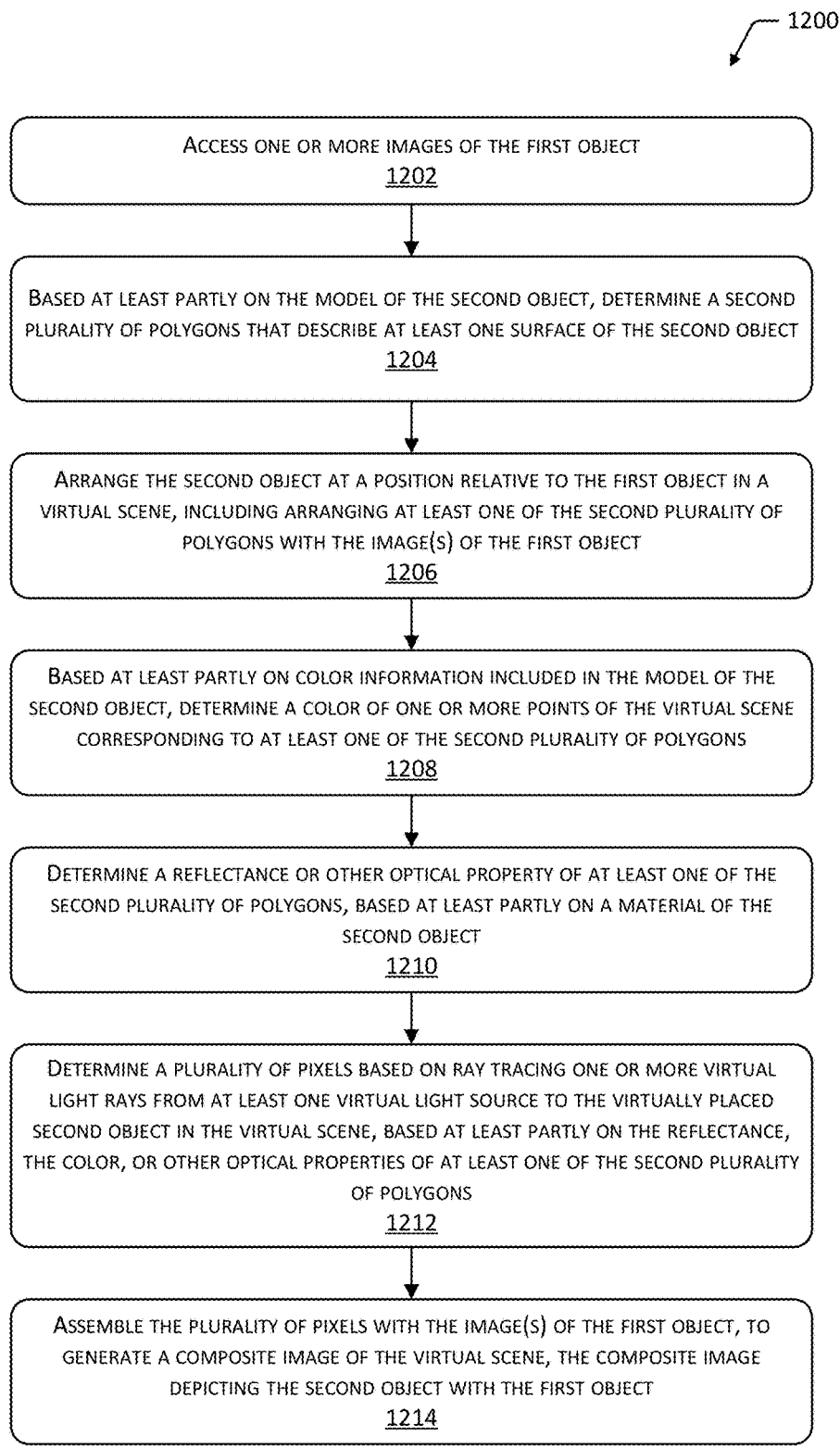
FIG. 12 depicts a flow diagram of a process for performing ray tracing operations to generate the composite image, employing a polygonal mesh model of the second object.

FIG. 12 depicts a flow diagram 1200 of a process for performing ray tracing operations to generate the composite image 134, employing a polygonal mesh model of the second object 110. Operations of the process may be performed by the image processing module 128, the ray tracing module 314, other modules of the image processing server device 126, or other modules executing on other devices.

At 1202, one or more images 114 of the first object 104 may be received or otherwise accessed, as described above.

At 1204, based at least partly on the model 132 a second plurality of polygons may be determined that describe at least one surface of the second object 110. In some cases the model 132 may itself include a polygonal mesh model of the second object 110, including the second plurality of polygons. Alternatively, in cases where the model 132 includes point cloud data or edge information, the model 132 may be transformed to a polygonal mesh model for the second object 110 as described above.

At 1206, the second object 110 may be arranged in a virtual scene with the first object 104. In some implementations, this virtual placement may include virtually arranging at least one of the second plurality of polygons corresponding to the second object 110 in the virtual scene with at least a portion of the image(s) 114 of the first object 104. In some implementations, the position of the second object 110 relative to the first object 104 in the virtual scene may be based at least partly on the position information 124 included in the composite image request 120 as described above. Alternatively, the position of the second object 110 relative to the first object 104 may be inferred based on a likely use or purpose of the second object 110. For example, if the second object 110 is a wrist watch and the first object 104 is at least a portion of the user, the position of the second object 110 may be determined as on or near a wrist of the user.

At 1208, based at least partly on color information included in the model 132 of the second object 110, a color may be determined for one or more points of the virtual scene that are in one or more of the second plurality of polygons for the second object 110. Alternatively, the model 132 may not include color information for the second object 110. In such cases, the color(s) for the second object 110 may be determined based on an analysis of one or more images of the second object 110, the analysis proceeding similarly to that described with reference to 1108.

At 1210, a reflectance or other optical properties may be determined for one or more polygons in the second plurality of polygons, as described above with reference to 1112.

At 1212, ray tracing operations may be performed to determine a plurality of pixels corresponding to the second object 110. As described above, the ray tracing may include virtually tracing a path of one or more virtual light rays 606 from at least one virtual light source 604 to at least one of the second plurality of polygons corresponding to the second object 110 in the virtual scene. The optical effects (e.g., reflection, refraction, scattering, or dispersion) of the virtual light rays 606 interacting with the polygons may be analyzed to determine a pixel corresponding to a point on the surface(s) where one or more virtual light rays 606 intersect the surface(s). In some implementations, as described above with reference to FIG. 6, such optical effects may be determined based on or more reflectance models applied to the polygons. The reflectance model for each polygon may be determined based on an inferred or otherwise determined material composition of a portion of a surface corresponding to the polygon.

At 1214, the plurality of pixels corresponding to the second object 110 may be assembled with at least a portion of the image(s) 114 of the first object 104, to generate the composite image 134.

Those having ordinary skill in the art will readily recognize that certain steps or operations illustrated in the figures above can be eliminated, combined, subdivided, executed in parallel, or taken in an alternate order. Moreover, the methods described above may be implemented as one or more software programs for a computer system and are encoded in one or more computer-readable storage media as instructions executable on one or more processors.

Separate instances of these programs may be executed on or distributed across separate computer systems. Thus, although certain steps have been described as being performed by certain devices, software programs, processes, or entities, this need not be the case and a variety of alternative implementations will be understood by those having ordinary skill in the art.

Additionally, those having ordinary skill in the art readily recognize that the techniques described above can be utilized in a variety of devices, environments, and situations. Although the present disclosure is written with respect to specific embodiments and implementations, various changes and modifications may be suggested to one skilled in the art and it is intended that the present disclosure encompass such changes and modifications that fall within the scope of the appended claims.

What is claimed is:

1. A computer-implemented method, comprising:
accessing one or more images of a first object, the one or more images captured using at least one camera included in a user device;
accessing depth information determined by at least one depth sensor of the user device measuring distance from the user device to at least a portion of the first object;
receiving, from the user device, a composite image request including an object identifier (ID) identifying a second object to be rendered with the first object and user specified position information indicating a preferred position at which to display the second object relative to the first object in a composite image;
processing the depth information to determine a first plurality of polygons representing at least a portion of a surface of the first object;
accessing a three-dimensional model of the second object using the object ID identifying the second object, the three-dimensional model including three-dimensional coordinates of points associated with a second plurality of polygons representing at least a portion of a surface of the second object identified by the object ID;
arranging the second plurality of polygons representing at least the portion of the surface of the second object relative to the first plurality of polygons representing at least the portion of the surface of the first object in a virtual scene based on the user specified position information specified in the composite image request;
generating the composite image of the virtual scene, wherein the composite image comprises a plurality of pixels, and wherein values for the plurality of pixels are determined by ray tracing one or more virtual light rays from at least one virtual light source toward the second plurality of polygons representing at least the portion of the surface of the second object identified by the object ID and the first plurality of polygons representing at least the portion of the surface of the first object in the virtual scene; and
sending the composite image to the user device.

2. The method of claim 1, further comprising:
receiving, from the user device, information describing one or more of user specified orientation information indicative of an orientation to render the second object identified by the object ID relative to the first object in the virtual scene or user specified scale information indicative of a scale at which to render the second object relative to the first object in the virtual scene; and
wherein the arranging a visual representation of the second object relative to the visual representation of the first object in the virtual scene is further based on one or more of the user specified orientation information or the user specified scale information.

3. The method of claim 1, further comprising:
determining a color of at least one of the first plurality of polygons, based at least partly on color information included in the one or more images of the first object; and
wherein the generating of the composite image is further based at least partly on the color of the at least one of the first plurality of polygons.

4. The method of claim 1, further comprising:
determining a reflectance of the at least one of the second plurality of polygons, based at least partly on at least one material that comprises at least the portion of the surface of the second object; and
wherein the generating of the composite image is further based at least partly on the reflectance of the at least one of the second plurality of polygons.

5. A system, comprising:
at least one memory storing computer-executable instructions; and
at least one processor in communication with the at least one memory, the at least one processor configured to access the at least one memory and execute the computer-executable instructions to:
access one or more images of a first object;
access depth information indicating distance from a user device to at least a portion of the first object;
receive, from the user device, a composite image request including an object identifier (ID) identifying a second object to be rendered with the first object and user specified position information indicating a preferred position at which to display the second object relative to the first object in a composite image;
process the depth information to determine a first plurality of polygons representing at least a portion of a surface of the first object;
access a three-dimensional model of the second object using the object ID identifying the second object including three-dimensional coordinates of points associated with a second plurality of polygons representing at least a portion of a surface of the second object identified by the object ID;
arrange the second plurality of polygons representing at least the portion of the surface of the second object relative to the first plurality of polygons representing at least the portion of the surface of the first object in a virtual scene based on the user specified position information;
generate the composite image of the virtual scene, wherein the composite image comprises a plurality of pixels, and wherein values for the plurality of pixels are determined by using ray tracing by directing one or more virtual light rays from at least one virtual light source toward the second plurality of polygons representing at least the portion of the surface of the second object identified by the object ID and the first plurality of polygons representing at least the portion of the surface of the first object in the virtual scene; and
send the composite image to the user device.

6. The system of claim 5, wherein the one or more images are captured using at least one camera included in the user device.

7. The system of claim 5, wherein:
the depth information describes coordinates of a plurality of tracking points associated with at least the portion of the surface of the first object, the plurality of tracking points determined by at least one depth sensor of the user device measuring distance from the user device to at least the portion of the surface of the first object; and
the determining of the first plurality of polygons is based at least partly on the coordinates of the plurality of tracking points.

8. The system of claim 5, wherein:
the at least one processor is further configured to determine one or more colors corresponding to the first plurality of polygons, based at least partly on color information included in the one or more images of the first object; and
the generating of the composite image of the virtual scene is further based at least partly on the one or more colors corresponding to the first plurality of polygons.

9. The system of claim 5, wherein:
the at least one processor is further configured to determine a reflectance of at least one of the second plurality of polygons, based at least partly on at least one material comprising at least the portion of the surface of the second object identified by the object ID; and
the generating of the composite image of the virtual scene is further based at least partly on the reflectance of the at least one of the second plurality of polygons.

10. The system of claim 5, wherein the three-dimensional model of the second object identified by the object ID comprises one or more of:
a plurality of points that describe physical dimensions of the second object;
a plurality of edges that describe a physical extent of the second object; or
the second plurality of polygons that describe one or more surfaces of the second object.

11. The system of claim 5, wherein:
the first object includes at least a portion of a person; and
the second object identified by the object ID includes at least a portion of a product available for purchase.

12. The system of claim 5, wherein:
the composite image request includes information describing one or more of user specified orientation information indicative of an orientation to render the second object identified by the object ID relative to the first object in the virtual scene or user specified scale information indicative of a scale at which to render the second object relative to the first object in the virtual scene; and
the arranging of the second object identified by the object ID relative to the first object in the virtual scene is further based on one or more of the user specified orientation information or the user specified scale information.

13. The system of claim 5, wherein the ray tracing is of one or more virtual light rays from the at least one virtual light source to points in the virtual scene.

14. The system of claim 13, wherein the at least one processor is further configured to:
receive ambient light information describing ambient light illuminating the first object; and
determine a position of the at least one virtual light source based at least partly on the ambient light information.

15. One or more non-transitory computer-readable media storing instructions which, when executed by at least one processor, instruct the at least one processor to perform actions comprising:
accessing one or more images of a first object including depth information associated with the first object;
receiving a composite image request including an object identifier (ID) identifying a second object to be rendered with the first object and user specified position information indicating a preferred position at which to display the second object identified by the object ID relative to the first object in a composite image;
processing the depth information to determine a surface of the first object;
accessing a three-dimensional model of the second object using the object ID identifying the second object, the three-dimensional model including three-dimensional coordinates of points associated with a surface of the second object;
arranging a visual representation of the second object identified by the object ID relative to a visual representation of the first object in a virtual scene based at least partly on the three-dimensional coordinates of the points associated with the surface of the second object from the three-dimensional model of the second object identified by the object ID and on the user specified position information specified in the composite image request; and
generating the composite image of the virtual scene, wherein the composite image comprises a plurality of pixels, and wherein values for the plurality of pixels are determined by using ray tracing directing at least one virtual light source toward the surface of the second object identified by the object ID and the surface of the first object.

16. The one or more non-transitory computer-readable media of claim 15, the actions further comprising:
including information in the composite image request describing one or more of user specified orientation information indicative of an orientation to render the second object identified by the object ID relative to the first object in the virtual scene or user specified scale information indicative of a scale at which to render the second object relative to the first object in the virtual scene; and
wherein the arranging of the second object identified by the object ID relative to the first object in the virtual scene is further based on one or more of the user specified orientation information or the user specified scale information.

17. The one or more non-transitory computer-readable media of claim 15, wherein:
the arranging the visual representation of the second object identified by the object ID relative to the visual representation of the first object in the virtual scene includes arranging at least a portion of the one or more images of the first object with at least a portion of the model of the second object identified by the object ID;
the ray tracing includes tracing one or more virtual light rays from at least one virtual light source to one or more points in the virtual scene that correspond to the second object identified by the object ID; and
assembling the plurality of pixels to generate the composite image of the virtual scene comprises assembling at least a portion of the one or more images of the first object with the plurality of pixels corresponding to the second object identified by the object ID.

18. The one or more non-transitory computer-readable media of claim 15, wherein the three-dimensional model of the second object identified by the object ID includes one or more of:
- a plurality of points that describe physical dimensions of the second object;
- a plurality of edges that describe a physical extent of the second object; or
- a plurality of polygons that describe one or more surfaces of the second object.

19. The one or more non-transitory computer-readable media of claim 15, wherein
- the first object includes at least a portion of a person; and
- the second object identified by the object ID includes a product available for purchase.

20. The one or more non-transitory computer-readable media of claim 19, wherein:
- the arranging of the product with the person in the virtual scene is based at least partly on the user specified position information.

21. The one or more non-transitory computer-readable media of claim 15, wherein the ray tracing includes tracing one or more virtual light rays from at least one virtual light source to one or more points in the virtual scene, and wherein the actions further comprise:
- receiving ambient light information describing ambient light illuminating the first object; and
- determining a position of the at least one virtual light source based at least partly on the ambient light information.

* * * * *